US010194100B2

(12) United States Patent
Zhou et al.

(10) Patent No.: US 10,194,100 B2
(45) Date of Patent: Jan. 29, 2019

(54) GLARE SUPPRESSION THROUGH FOG BY OPTICAL PHASE CONJUGATION ASSISTED ACTIVE CANCELLATION

(71) Applicant: California Institute of Technology, Pasadena, CA (US)

(72) Inventors: Edward H. Zhou, Pasadena, CA (US); Joshua Brake, Pasadena, CA (US); Changhuei Yang, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 114 days.

(21) Appl. No.: 15/332,959

(22) Filed: Oct. 24, 2016

(65) Prior Publication Data

US 2017/0118423 A1   Apr. 27, 2017

Related U.S. Application Data

(60) Provisional application No. 62/245,843, filed on Oct. 23, 2015, provisional application No. 62/245,847, filed on Oct. 23, 2015.

(51) Int. Cl.
*H04N 5/357* (2011.01)
*G02B 27/00* (2006.01)
*G02B 27/10* (2006.01)
*H04N 5/225* (2006.01)
*G02B 26/06* (2006.01)

(52) U.S. Cl.
CPC ............ *H04N 5/357* (2013.01); *G02B 26/06* (2013.01); *G02B 27/0068* (2013.01); *G02B 27/1066* (2013.01); *H04N 5/2254* (2013.01)

(58) Field of Classification Search
CPC ............... G02B 26/06; G02B 27/0068; G02B 27/1066; H04N 5/357–5/3675
See application file for complete search history.

(56) References Cited

U.S. PATENT DOCUMENTS

2009/0273843 A1* 11/2009 Raskar ............... G02B 27/0018
359/601

OTHER PUBLICATIONS

Zhou, Edward H., et al., "Glare suppression by coherence gated negation," vol. 3, No. 10, Oct. 2016, Optica, pp. 1107-1113.
Zhou, Edward H., et al., "Glare suppression by coherence gated negation: supplementary material," vol. 3, No. 10, Oct. 2016, Optica, pp. 1-3.
Mosk, A.P., et al., "Controlling waves in space and time for imaging and focusing in complex media," Nature Photonics, May 2012, pp. 283-292, vol. 6.

(Continued)

*Primary Examiner* — Paul M Berardesca
(74) *Attorney, Agent, or Firm* — Gates & Cooper LLP

(57) ABSTRACT

A method of imaging an object on one or more sensor pixels and with reduced glare. The method includes irradiating a scattering medium and the object behind the scattering medium, creating backscattered radiation and imaging radiation that are received on the one or more pixels. The method includes digitally adjusting a phase, an amplitude, or a phase and amplitude, of reference radiation transmitted onto the one or more sensor pixels, wherein the reference radiation destructively interferes with the backscattered radiation (glare) on the one or more sensor pixels while the object is imaged on the one or more sensor pixels using the imaging radiation.

20 Claims, 17 Drawing Sheets

(56) References Cited

OTHER PUBLICATIONS

Horstmeyer, R., et al., "Guidestar-assisted wavefront shaping methods for focusing light into biological tissue," Nature Photonics, Sep. 2015, pp. 563-571, vol. 9.

Yaqoob, Z., et al., "Optical phase conjugation for turbidity suppression in biological samples," Nature Photonics, Feb. 2008, pp. 110-115, vol. 2.

Bertolotti, J., et al., "Non-invasive imaging through opaque scattering layers," Nature, Nov. 8, 2012, pp. 232-234, vol. 491.

Katz, O., et al., "Looking around corners and through thin turbid layers in real time with scattered incoherent light", Nature Photonics, Aug. 2012, pp. 549-553, vol. 6.

Ji, N., et al., "Adaptive optics via pupil segmentation for high-resolution imaging in biological tissues", Nature Methods, Feb. 2010, pp. 141-147, vol. 7, No. 2.

Zhou, E.H. et al. "Focusing on moving targets through scattering samples", Optica, Oct. 2014, pp. 227-232, vol. 1, No. 4.

Yang, X., et al., "Imaging blood cells through scattering biological tissue using speckle scanning microscopy", Optics Express, 2014, pp. 3405-3413, vol. 22, No. 3.

Hsieh, C-L, et al., "Digital phase conjugation of second harmonic radiation emitted by nanoparticles in turbid media", Optics Express, Jun. 2010, pp. 12283-12290, vol. 18, No. 12.

Katz, O., et al., "Non-invasive single-shot imaging through scattering layers and around corners via speckle correlations", Nature Photonics, Oct. 2014, pp. 784-790, vol. 8.

Edrei, E. et al., "Optical imaging through dynamic turbid media using the Fourier-domain shower-curtain effect", Optica, Jan. 2016, pp. 71-74, vol. 3, No. 1.

Laurenzis, M., et al., "3D range gated imaging in scattering environments", Proc. of SPIE, 2010, pp. 768406-1-768406-9, vol. 7684.

Laurenzis, M., et al., "Investigation of range-gated imaging in scattering environments", Optical Engineering, Jun. 2012, pp. 061303-1-061303-6, vol. 51, No. 6.

Laurenzis, M., et al., "Image coding for three-dimensional range-gated imaging", Applied Optics, Jul. 20, 2011, pp. 3824-3828, vol. 50, No. 21.

Buttafava, M., et al., "Non-line-of-sight imaging using a time-gated single photon avalanche diode", Optics Express, Aug. 2015, pp. 1-15, vol. 23, No. 16.

Gariepy, G., et al., "Single-photon sensitive light-in-flight imaging", Nature Communications, 2015, pp. 1-6, vol. 6, No. 6021.

Guerrieri, F., et al., "Two-Dimensional SPAD Imaging Camera for Photon Counting", IEEE Photonics Journal, Oct. 2010, pp. 759-774, vol. 2, No. 5.

Gariepy, G., et al., "Detection and tracking of moving objects hidden from view", Nature Photonics, Jan. 2016, pp. 23-27, vol. 10.

Velten, A., et al., "Recovering three-dimensional shape around a corner using ultrafast time-of-flight imaging", Nature Communications, 2012, pp. 1-8, vol. 3, No. 745.

Kadambi, A., et al., "Frequency Domain TOF: Encoding Object Depth in Modulation Frequency", arXiv:1503.01804, 2015.

Gao, L., et al., "Single-shot compressed ultrafast photography at one hundred billion frames per second", Nature, Dec. 2014, pp. 74-82, vol. 516.

Liang, J., et al., "Encrypted Three-dimensional Dynamic Imaging using Snapshot Time-of-flight Compressed Ultrafast Photography", Scientific Reports, 2015, pp. 1-10, vol. 5, No. 15504.

Zhu, L., et al "Space- and intensity-constrained reconstruction for compressed ultrafast photography", Optica, Jul. 2016, pp. 694-697, vol. 3, No. 7.

Leitch, R.R., et al., "Active noise control system", IEE Proceedings, Jun. 1987, pp. 525-546, vol. 134, Pt. A, No. 6.

Huang, D., et al., "Optical Coherence Tomography", Science, Nov. 1991, pp. 1178-1181, vol. 254.

Grulkowski, I., et al., "High-precision, high-accuracy ultralong-range swept-source optical coherence tomography using vertical cavity surface emitting laser light source", Optics Letters, Mar. 2013, pp. 673-675, vol. 38, No. 5.

Woo, S., et al., "Depth-selective imaging of macroscopic objects hidden behind a scattering layer using low-coherence and wide-field interferometry", Optics Communications, 2016, pp. 210-214, vol. 372.

Yamaguchi, I., et al., "Phase-shifting color digital holography", Optics Letters, Jul. 1, 2002, pp. 1108-1110, vol. 27, No. 13.

Zhang, S., et al., "Superfast phase-shifting method for 3-D shape measurement", Optics Express, Apr. 26, 2010, pp. 9684-9689, vol. 18, No. 9.

Huang, P.S., et al., "Fast three-step phase-shifting algorithm", Applied Optics, Jul. 20, 2006, pp. 5086-5091, vol. 45, No. 21.

Freund, I., "Joseph W. Goodman: Speckle Phenomena in Optics: Theory and Applications", J. Stat. Phys., 2008, pp. 413-414, vol. 130, Springer.

Cui, M., et al., "Implementation of a digital optical phase conjugation system and its application to study the robustness of turbidity suppression by phase conjugation", Optics Express, Feb. 15, 2010, pp. 3444-3455, vol. 18, No. 4.

Popoff, S.M., et al., "Measuring the Transmission Matrix in Optics: An Approach to the Study and Control of Light Propagation in Disordered Media", Physical Review Letters, 2010, pp. 100601-1-100601-4, vol. 104.

Larimer, J., et al., "Engineering a Visual System for Seeing Through Fog", SAE Technical Paper Series, 1992, pp. 1-6, No. 921130, 22nd International Conference on Environmental Systems, Seattle, Washington.

Lohmann, A.W., et al., "Holography Through Fog. A New Version", Optics Communications, Sep. 1978, pp. 318-321, vol. 26, No. 3.

Schmalfuss, H., "Real-Time Seeing Through Moving Fog", Optics Communications, Jun. 1976, pp. 245-246, vol. 17, No. 3.

Wang, Y.M., et al., "Deep-tissue focal fluorescence imaging with digitally time-reversed ultrasound-encoded light", Nature Communications, 2012, pp. 1-8, vol. 3, No. 928.

\* cited by examiner

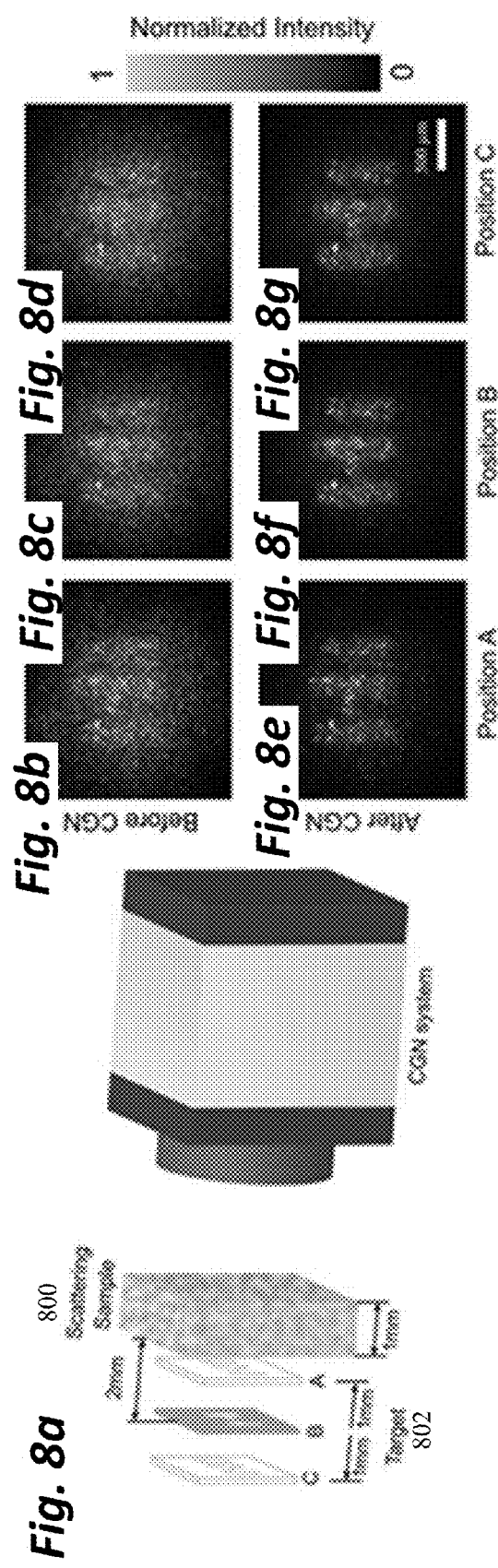

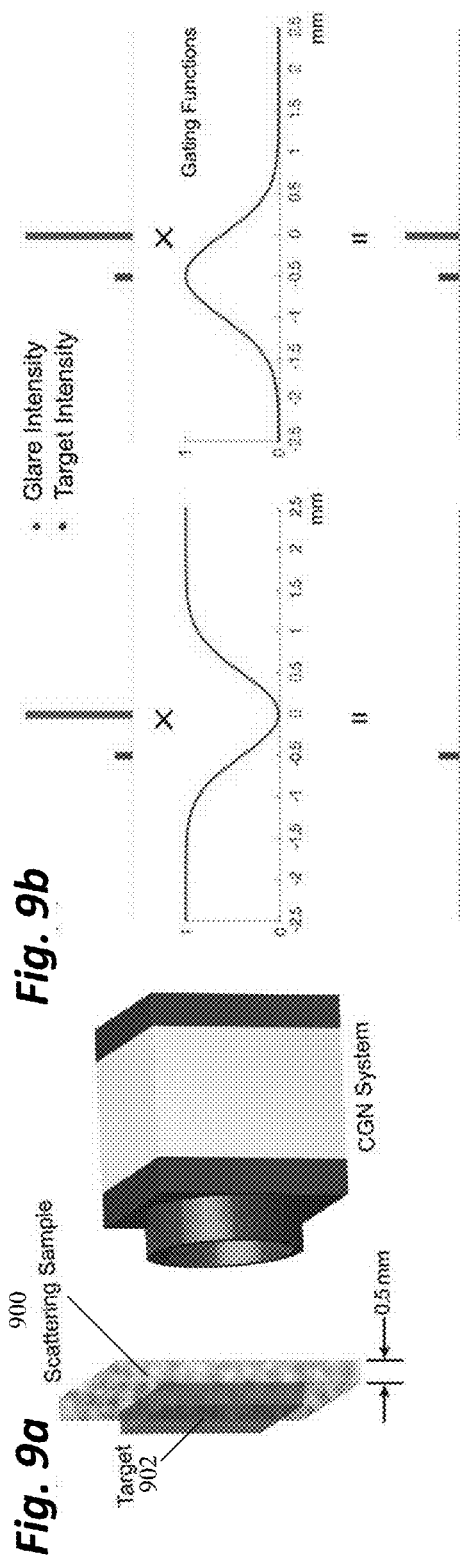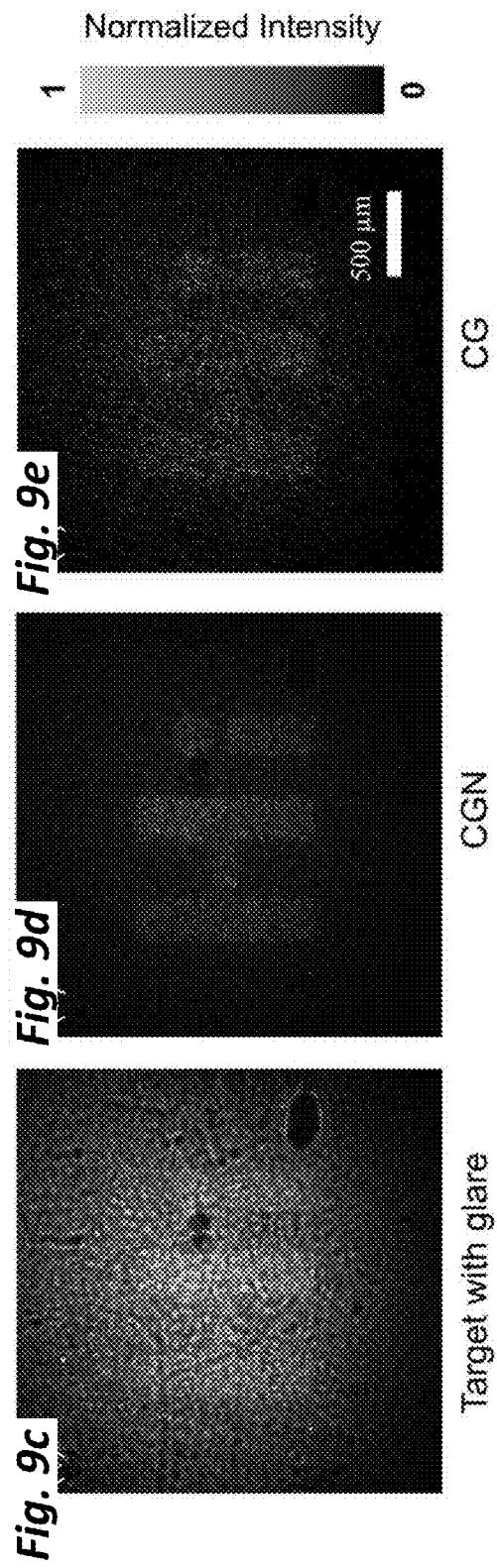

GLARE SUPPRESSION THROUGH FOG BY OPTICAL PHASE CONJUGATION ASSISTED ACTIVE CANCELLATION

CROSS REFERENCE TO RELATED APPLICATIONS

This application claims the benefit under 35 U.S.C. Section 119(e) of commonly-assigned U.S. applications:

U.S. Provisional Patent Application No. 62/245,847, filed Oct. 23, 2015, by Edward H. Zhou, Joshua Brake, and Changhuei Yang, entitled "FOG GLARE SUPPRESSION BY COHERENCE GATING NEGATION"; and U.S. Provisional Patent Application No. 62/245,843, filed Oct. 23, 2015, by Edward H. Zhou, Joshua Brake, and Changhuei Yang, entitled "GLARE SUPPRESSION THROUGH FOG BY OPTICAL PHASE CONJUGATION ASSISTED ACTIVE CANCELLATION";

which applications are incorporated by reference herein.

This application is related to the following co-pending and commonly-assigned patent applications, which applications are incorporated by reference herein:

U.S. Utility patent application Ser. No. 15/181,160 filed on Jun. 13, 2016, by Haowen Ruan, Mooseok Jang, Changhuei Yang, and Daifa Wang, entitled "OPTICAL FOCUSING INSIDE SCATTERING MEDIA WITH TIME-REVERSED ULTRASOUND MICROBUBBLE ENCODED (TRUME) LIGHT", which application claims the benefit under 35 USC Section 119(e) of U.S. Provisional Patent Application Ser. No. 62/174,858, filed on Jun. 12, 2015, by Haowen Ruan, Mooseok Jang, Changhuei Yang, and Daifa Wang, entitled "OPTICAL FOCUSING INSIDE SCATTERING MEDIA WITH TIME-REVERSED ULTRASOUND MICROBUBBLE ENCODED (TRUME) LIGHT";

U.S. Utility patent application Ser. No. 14/631,684 filed on Feb. 25, 2015, by Benjamin Judkewitz, Haojiang Zhou, and Changhuei Yang, entitled "DIGITAL PHASE CONJUGATION USING MOVING TARGET AS GUIDE STAR", which application claims the benefit under 35 USC Section 119(e) of U.S. Provisional Patent Application Ser. No. 61/944,368, filed on Feb. 25, 2014, by Benjamin Judkewitz, Haojiang Zhou, and Changhuei Yang, entitled "DIGITAL PHASE CONJUGATION USING MOVING TARGET AS GUIDE STAR";

U.S. Provisional patent application Ser. No. 14/070,045, filed on Nov. 1, 2013, by Benjamin Judkewitz, Ying Min Wang, Roarke Horstmeyer, and Changhuei Yang, entitled "TIME-REVERSAL OF VARIANCE ENCODED LIGHT", which application claims the benefit under 35 USC 119(e) of U.S. Provisional Patent Application Ser. No. 61/721,325, filed on Nov. 1, 2012, by Benjamin Judkewitz, Ying Min Wang, Roarke Horstmeyer, and Changhuei Yang, entitled "TIME-REVERSAL OF VARIANCE ENCODED LIGHT";

U.S. Utility patent application Ser. No. 13/851,901, now U.S. Pat. No. 9,313,423, filed on Mar. 27, 2013, by Ying Min Wang, Benjamin Judkewitz, Charles A. DiMarzio, and Changhuei Yang, entitled "DEEP TISSUE FLUORESCENCE IMAGING USING DIGITALLY TIME-REVERSED ULTRASOUND-ENCODED LIGHT", which application claims the benefit under 35 U.S.C. Section 119(e) of U.S. Provisional Patent Application Ser. No. 61/616,347, filed on Mar. 27, 2012, by Ying Min Wang, Benjamin Judkewitz, Charles A. DiMarzio, and Changhuei Yang, entitled "DEEP TISSUE FLUORESCENCE IMAGING USING DIGITALLY TIME-REVERSED ULTRASOUND-ENCODED LIGHT";

U.S. Utility patent application Ser. No. 12/886,320, filed on Sep. 20, 2010, by Zahid Yaqoob, Emily McDowell and Changhuei Yang, entitled "OPTICAL PHASE PROCESSING IN A SCATTERING MEDIUM", which application is a divisional of U.S. Utility patent application Ser. No. 11/868,394, filed on Oct. 5, 2007, by Zahid Yaqoob, Emily McDowell and Changhuei Yang, entitled "TURBIDITY ELIMINATION USING OPTICAL PHASE CONJUGATION AND ITS APPLICATIONS", which application claims priority under 35 U.S.C. § 119(e) to commonly-assigned U.S. Provisional Patent Application Ser. No. 60/850,356, filed on Oct. 6, 2006, by Zahid Yaqoob, Emily McDowell and Changhuei Yang, entitled "TURBIDITY ELIMINATION USING OPTICAL PHASE CONJUGATION AND ITS APPLICATIONS";

U.S. patent application Ser. No. 12/943,857, filed on Nov. 10, 2010, by Changhuei Yang and Meng Cui, entitled "TURBIDITY SUPPRESSION BY OPTICAL PHASE CONJUGATION USING A SPATIAL LIGHT MODULATOR", which application claims the benefit under 35 U.S.C. § 119(e) of the following commonly-assigned U.S. provisional patent applications, which are incorporated by reference herein:

a. Provisional Application Ser. No. 61/259,975, filed on Nov. 10, 2009, by Changhuei Yang and Meng Cui, entitled "APPROACHES FOR BUILDING COMPACT FLUORESCENCE MICROSCOPES;"

b. Provisional Application Ser. No. 61/260,316, filed on Nov. 11, 2009, by Changhuei Yang and Meng Cui, entitled "APPLICATIONS OF TURBIDITY SUPPRESSION BY OPTICAL PHASE CONJUGATION";

c. Provisional Patent Application Ser. No. 61/376,202, filed on Aug. 23, 2010, by Meng Cui and Changhuei Yang, entitled "OPTICAL PHASE CONJUGATION 4PI MICROSCOPE"; and d. Provisional Application Ser. No. 61/355,328, filed on Jun. 16, 2010 by Meng Cui, Ying Min Wang and Changhuei Yang, entitled "ACOUSTIC ASSISTED PHASE CONJUGATE OPTICAL TOMOGRAPHY";

U.S. Utility application Ser. No. 12/943,841, filed on Nov. 10, 2010, by Meng Cui, Ying Min Wang, Changhuei Yang and Charles DiMarzio, entitled "ACOUSTIC ASSISTED PHASE CONJUGATE OPTICAL TOMOGRAPHY", which application claims priority under 35 U.S.C. § 119(e) to and commonly-assigned U.S. Provisional Application Ser. No. 61/355,328, filed on Jun. 16, 2010, by Meng Cui, Ying Min Wang, and Changhuei Yang, entitled "ACOUSTIC ASSISTED PHASE CONJUGATE OPTICAL TOMOGRAPHY"; U.S. Provisional Application Ser. No. 61/259,975, filed on Nov. 10, 2009, by Changhuei Yang and Meng Cui, entitled "APPROACHES FOR BUILDING COMPACT FLUORESCENCE MICROSCOPES"; U.S. Provisional Application Ser. No. 61/260,316, filed on Nov. 11, 2009, by Changhuei Yang and Meng Cui, entitled "APPLICATIONS OF TURBIDITY SUPPRESSION BY OPTICAL PHASE CONJUGATION"; and U.S. Provisional Patent Application Ser. No. 61/376,202, filed on Aug. 23, 2010, by Meng Cui and Changhuei Yang, entitled "OPTICAL PHASE CONJUGATION 4PI MICROSCOPE"; and U.S. Utility application Ser. No. 13/157,194, filed on Jun. 9, 2011, by Meng Cui, Ying Min Wang, and Changhuei Yang, entitled "ITERATIVE TIME-REVERSAL ENHANCED TRANSMISSION SOLVING APPROACH", which application claims the benefit under 35 U.S.C. § 119(e) of Provisional Application Ser. No. 61/355,326, filed on Jun. 16, 2010, by Meng Cui, Ying Min Wang, and Changhuei Yang, entitled "ITERATIVE TIME-REVERSAL ENHANCED TRANSMISSION SOLVING APPROACH".

STATEMENT REGARDING FEDERALLY SPONSORED RESEARCH AND DEVELOPMENT

This invention was made with government support under Grant No. NS090577 awarded by the National Institutes of Health. The government has certain rights in the invention.

BACKGROUND OF THE INVENTION

1. Field of the Invention

The present invention relates to methods and devices for suppressing glare.

2. Description of the Related Art (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.) The problem of trying to see through fog has long been a serious challenge in automotive, aeronautical, and military applications, creating dangerous situations when trying to navigate without being able to see clearly. Several approaches have tried to tackle this problem by implementing real time holography systems to try and peer through the fog. However, these approaches were hampered by low resolution, limited imaging distance, and slow operating speed [36-38].

SUMMARY OF THE INVENTION

One or more embodiments of the present invention describe a simpler solution to the problem of trying to see through a scattering medium (such as fog or water vapor), by identifying that the major limitation to seeing through the scattering medium is often the glare created by the illumination of the scattering medium from the vantage point of the viewer. The present invention suppresses the glare, so that the scattering medium has a much smaller impact on the ability of the viewer to see objects in the scattering medium.

One or more embodiments of the present invention disclose a method of imaging an object with reduced glare, comprising irradiating a scattering medium and the object behind the scattering medium with electromagnetic radiation, wherein the scattering medium backscatters a first portion of the electromagnetic radiation forming backscattered radiation, and the object reflects a second portion of the electromagnetic radiation forming imaging radiation. The method further comprises receiving the backscattered radiation and the imaging radiation on one or more sensor pixels; and digitally adjusting a phase, an amplitude, or a phase and amplitude, of reference radiation transmitted onto the one or more sensor pixels. The reference radiation destructively interferes with the backscattered radiation on the one or more sensor pixels while the object is imaged on the one or more sensor pixels using the imaging radiation.

In one or more first embodiments including phase conjugation, the method further comprises measuring a backscattered field of a portion of the backscattered radiation, and the digitally adjusting comprises: computing a phase conjugate field comprising a phase conjugate of the backscattered field; computing a phase shifted field by phase shifting the phase conjugate field; and generating phase shifted radiation having the phase shifted field. In this embodiment, the method then further comprises irradiating the scattering medium with the phase shifted radiation, wherein the phase shifted radiation scatters off the scattering medium forming the reference radiation destructively interfering with the backscattered radiation on the one or more sensor pixels. In one or more of the phase conjugation embodiments, the electromagnetic radiation is emitted from one or more laser beam sources, each of the laser beam sources optically located at the same imaging plane position as a different one of the sensor pixels. In one or more further phase conjugation embodiments, the method further comprises detecting the backscattered field in a digital optical phase conjugation (DOPC) device; and generating the phase shifted radiation in the DOPC device. The DOPC device includes a camera detecting the backscattered field; and a spatial light modulator or a deformable mirror device electromagnetically coupled to the camera, wherein the spatial light modulator or the deformable mirror device generate the phase shifted radiation.

In one or more second embodiments, the method further comprises splitting the reference radiation from the electromagnetic radiation prior to irradiating the scattering medium with the electromagnetic radiation, and wherein the reference radiation does not interact with the scattering medium or the object. In the one or more second embodiments, the digitally adjusting comprises sweeping a power and phase of the reference radiation until glare on the one or more sensor pixels caused by the backscattered radiation is suppressed such that the object is visible in an image formed on the sensor pixels by the imaging radiation.

In one or more third embodiments, the one or more sensor pixels comprise a single photodetector at a camera lens' image plane, the photodetector having a photosensitive area that is equal to or smaller than a speckle size of the imaging radiation at the image plane. In the one or more third embodiments, the digitally adjusting comprises: raster-scanning the photodetector laterally through one or more positions in the image plane; at each of the positions, phase stepping a phase of the reference radiation through 3 increments; for each of the 3 increments, measuring the signal on the photodetector resulting from the interference between the reference radiation and the backscattered radiation on the photodetector; using the signals to calculate a cancellation phase that suppresses a magnitude of the backscattered radiation on the photodetector; adjusting the reference radiation such the reference radiation has the cancellation phase; and selecting the amplitude wherein the signal is minimized or reduced such that the object is visible in an image formed using the photodetector and the imaging radiation.

In any one of the previous embodiments, the sensor pixels' size can be smaller than $1.22\lambda/2NA$, where $\lambda$ is the wavelength of the electromagnetic radiation and NA is a numerical aperture of a camera lens imaging the backscattered radiation onto the one or more sensor pixels.

In one or more embodiments, the electromagnetic radiation is emitted from one or more lasers and/or the electromagnetic radiation has a coherence length longer than an optical path length of the electromagnetic radiation through the scattering medium.

One or more embodiments of the present invention further disclose an imaging apparatus implementing the above described methods.

One or more embodiments of the present invention further disclose a method of imaging an object, comprising, in a computer, digitally adjusting a phase, amplitude, or the phase and the amplitude of reference electromagnetic radiation.

BRIEF DESCRIPTION OF THE DRAWINGS

Referring now to the drawings in which like reference numbers represent corresponding parts throughout:

FIGS. 7(a) and 7(b) illustrate characterization of glare suppression factor, wherein FIG. 7(a) is a comparison of glare suppression factor between measurement and simulation results with various phase and amplitude steps. And FIG. 7(b) is a histogram of pixel intensities before and after glare suppression, with intensity maps of the glare shown in the insets.

FIG. 8(a) is an illustration of the target positions relative to a CGN system and FIGS. 8(b)-8(d) show images of the target at positions A, B, and C, respectively, before CGN while FIGS. 8(e)-8(g) show images of the target at positions A, B, and C, respectively, after CGN according to one or more embodiments of the present invention.

FIG. 9(a) is an illustration of the experimental configuration used to compare CGN according to one or more embodiments of the invention with a CG technique; FIG. 9(b) is a cartoon diagram that schematically illustrates the difference between CGN and CG techniques when both the target and scattering medium are within the coherence gating window, wherein the CGN technique uses an inverted coherence gating function to gate out the glare significantly, with less suppression of the target, resulting in higher target intensity than glare and the CG technique gates in the target intensity with less preservation of glare (however, the residue of the glare remains higher than the target intensity because of the strong nature of the glare; FIG. 9(c) is an original image of the target with glare; FIG. 9(d) is a reconstructed image of the target with the CGN technique; and FIG. 9(e) is a reconstructed image of the target with the CG technique.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Overview

The scattering nature of fog, sandstorms, and rain confound our ability to image objects within the medium. There are two major confounding factors in this imaging scenario. The first confounding factor has to do with the fact that scattering randomizes the light ray trajectories and effectively introduces a blur to the image [31]. In an anisotropically scattering medium, this blurring effect scales as a function of the reduced scattering coefficient. Practically, for macroscale objects such as a vehicle, this blurring effect is not necessarily a big issue for imaging consideration. A vehicle with its headlights on can be quite discernible (discernible=one can see its outline well) at 100 meters (m) in air even if the mean scattering length is 10 m.

The second confounding factor is the glare associated with trying to illuminate ahead of an observer to see non-emitting objects. In one example test situation, suppose observer A is equipped with a light source and a camera and target B is some distance ahead of A. There is no other light source present and A and B are immersed in a fog. Suppose A would like to image B. A can switch on A's light source and attempt to capture an image of B with A's camera. The backscattering from the fog will return much of the probe light towards A, presenting a glare. If B is a dimly reflective object, the amount of light returning from B to A may simply be too weak to be discerned in the presence of the strong glare. This glare effect can significantly impact our ability to see objects. For example, FIG. 1(a), FIG. 1(b) and FIG. 2 illustrate how it may not be possible to see a dimly reflective object through 10 m of fog in the same scenario as described above.

Figure 1A:
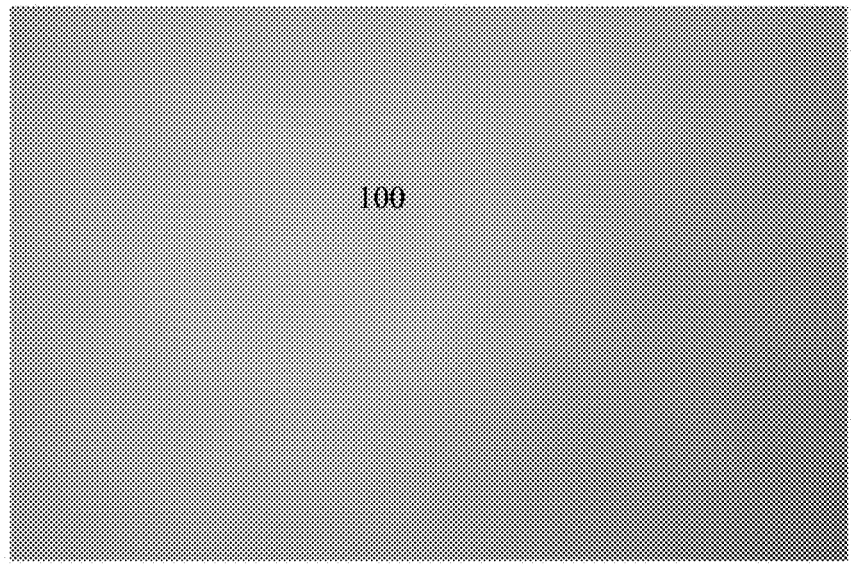
FIG. 1(a) shows a camera image captured with spotlight illumination, wherein the glare prevents visibility of the figurine.
Figure 1B:
FIG. 1(b) shows an image captured when the figurine is locally illuminated.

FIG. 1(a) and FIG. 1(b) show glare can significantly reduce our ability to image/probe into fog. In the example of FIG. 1(a), a camera and a spotlight are both pointed at a fog bank (generated by a fog machine) and a figurine is on the other side of this fog bank. FIG. 1(a) shows the camera image captured using spotlight illumination, wherein the glare 100 prevents us from seeing the figurine. FIG. 1(b), on the other hand, shows a captured image when the figurine 102 is locally illuminated 104. In FIG. 1(b), despite the slight blurring introduced by the fog scattering, the figurine 102 is readily discerned.

Figure 2:
FIG. 2 is an actual photo showing the impact of glare from ambient light multiply scattered in the fog.

FIG. 2 is an actual photo showing the impact of glare 200 from ambient light multiply scattered in the fog. The glare 200 occludes the vehicle on the extreme right. However, the vehicle's headlights 202 can be clearly seen without significant blurring. This suggests that if the glare 200 can be suppressed, a sufficiently well resolved image of the vehicle should be obtained.

Recent developments in wavefront shaping and adaptive optics have shown great promise in addressing the wavefront distortion challenge [1-6]. These methods have improved the imaging resolution beyond what was thought possible even a decade ago.

However, in almost all of the demonstrations performed so far, the problem of glare is averted either by choosing a target that emits light at a different wavelength (fluorescence [4,7,8] or second harmonic generation [9,10]) or by designing the experiments to operate in a transmission geometry [11,12]. Glare remains a challenge largely unaddressed in the context of these developments. Unfortunately, glare is unavoidable in a variety of practical scenarios-driving on a foggy night is a good example. In that scenario, the objects you would like to observe are unlikely to be fluorescent, and you simply cannot rely on having an independent light source behind the objects to provide you with a transmission imaging geometry. Glare suppression in principle is possible using time-of-flight methods with the help of fast imaging systems, such as those based on intensified charge-coupled device (ICCD) technology [13-15] or single-photon avalanche diode (SPAD) arrays [16-18]. These devices are able to bin the light arriving at the detector with fine temporal resolution, and therefore glare can be suppressed by discarding glare photons selected by their arrival time. Unfortunately, these instruments are very costly. But perhaps more importantly, the range to which they can suppress glare is determined by their response speed. The best commercial instruments available have a response time of 0.5 ns, which translates to a minimum length of ~10 cm for which they can suppress glare by time gating. Recently, SPAD arrays with a temporal resolution of 67 ps have been demonstrated, which translates to a minimum glare suppression range of 1 cm. However, they are currently only available in small array sizes (32×32 pixels) [17,19].

There have also been some interesting developments in the use of modulated illumination and post-detection processing in the phase or frequency domain to achieve time-of-flight-based gating [20,21]. One significant limitation to these methods is that they need to contend with glare associated noise, as the glare is not suppressed prior to detection. Moreover, such techniques are limited by the frequency bandwidth of the sensors, which leads to a minimum length involved on the order of meters. This length limitation for all known glare countering methods precludes useful applications of such time-of-flight methods in biomedicine where the length scale of interest ranges from micrometers to millimeters.

The streak camera is yet another fast response optical detection system. Its response speed is on the order of 1 ps. Unfortunately, the streak camera is intrinsically a one-dimensional imaging system. Recently, it has been demonstrated that the use of compressed sensing can allow the streak camera to perform fast two dimensional imaging with a spatial resolution of 11 mm [22-24].

However, the object sparsity constraint is too restrictive for the majority of glare suppression applications. One or more embodiments of the present invention overcome these problems.

1. Optical Phase Conjugation Embodiment

The following approach represents an effective way to suppress glare directly. The proposed experimental setup is illustrated in FIG. 3.

An imaging camera 300 is rigged in such a way that each imaging pixel 302a can also output a probe light beam 304 as needed. Practically, such a system can be implemented by simply coupling a standard camera (e.g., charge coupled device CCD) with a laser array (or a Deformable Mirror Device or Digital Micromirror Device (DMD) illuminated with an input probe beam 306), via a beam splitter 308 such that the laser array (or DMD) and camera (e.g., CCD) are optically located at the same imaging plane 310.

The second necessary piece of equipment is a digital optical phase conjugation (DOPC) system [2]. In brief, this is a combined camera (CCD) and spatial light modulator (SLM) system that is capable of recording an input wavefront 312 and playing back a phase conjugate wavefront 314. A DOPC system is flexible enough to digitally alter the playback wavefront 314 characteristics—an advantage that is absent in conventional Optical Phase Conjugation (OPC) systems and an advantage that is required in the proposed glare suppression scheme illustrated in FIG. 3.

Figure 3:
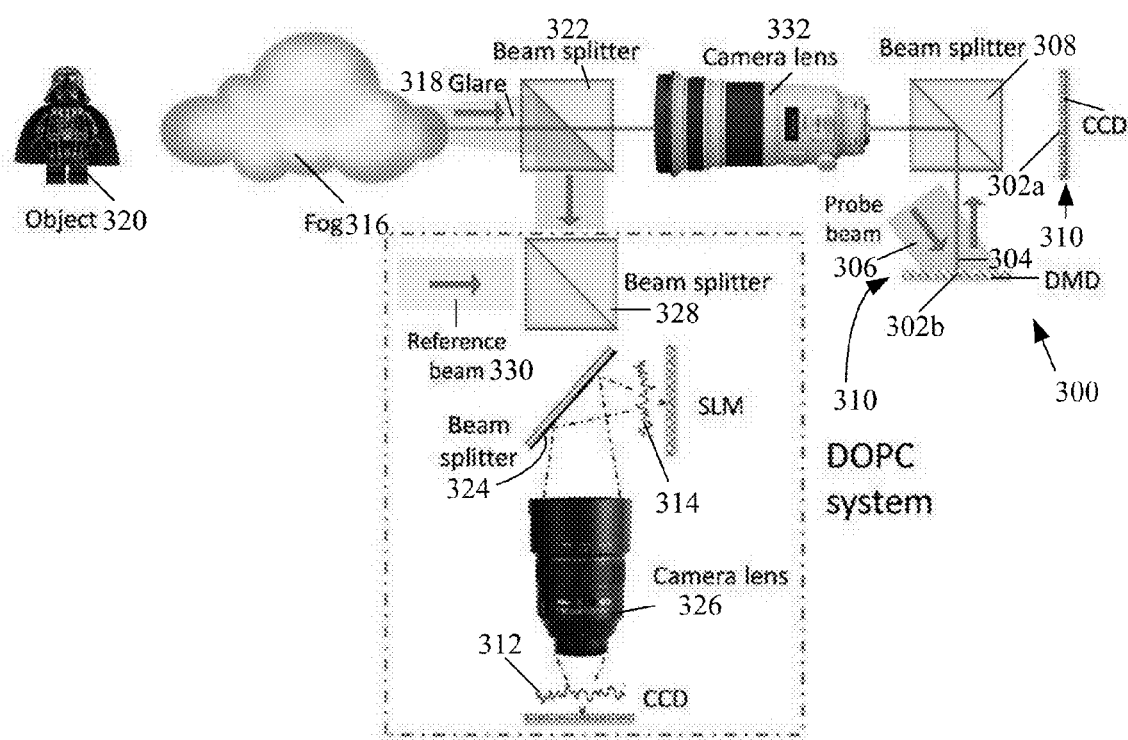
FIG. 3 is an experimental setup suppressing glare using optical phase conjugation, according to one or more embodiments of the present invention, wherein arrows indicate light trajectories.

In operation, the imaging camera 300 and DOPC system are placed side-by-side facing the fog 316 as shown in FIG. 3. Next, the probe beam 304 associated with a single pixel 302a on the imaging camera 300 is turned on. The probe light 304 diffuses through the fog 316 and some of it enters the DOPC system. Then, the DOPC system is used to record a wavefront 312 resulting from the probe light 304 diffusing through the fog.

During playback, simply generating phase conjugate light having a phase conjugate light field and wavefront 314 causes the phase conjugate light to diffuse back through the fog 316, where the constituent light field components (of the phase conjugate light) interfere constructively to create a peak intensity spot at the imaging pixel 302a—providing the maximum amount of glare 318 at the pixel 302a. Conversely, if a pi phase shift is introduced to half of the phase conjugate light field, the constituent light field components will arrive at the imaging pixel 302a and interfere destructively to fully suppress the glare at the imaging pixel 302a. The process and choice of phase shift to be introduced is not limited to the above described pi phase shift adjustment. Rather, it is simply desirable to modify the wavefront (both amplitude and phase) such that a destructive interference condition is achieved at the imaging pixel 302a).

This approach suppresses glare at the imaging pixel 302a and allows light 304 to propagate normally through the fog 316 to illuminate targets (e.g., an object 320) within the fog 316. To perform imaging, the process for each pixel 302a in the camera 300 is simply repeated.

Also shown in FIG. 3 are beamsplitter 322 directing some of the glare 318 into the DOPC, beamsplitter 324 and camera lens 326 for imaging the CCD onto the SLM, beamsplitter 328 directing reference beam 330 onto the SLM such that the SLM modulates the phase and/or amplitude of the reference beam 330 to form the reference beam having the phase conjugate wavefront 314, and camera lens 332 for imaging the object 320 on the pixels 302a.

The degree to which the glare can be suppressed is related to the effectiveness by which the cancellation can be accomplished. Interestingly, the suppression can effectively achieve zero glare (even if there is only access to two optical modes through the DOPC system) as long the amplitude and phase of the constituent light field are arranged to be exactly matched and of opposite phase. This is a significant consideration, from an engineering point of view, as it means that DOPC systems which only control a small number of optical modes can be used to implement this method. In addition, by only controlling a small number of modes, much faster response times can be achieved.

The range (glare suppression range, GSR) for which the approach using the DOPC system will work is dependent on the coherence length of the probe beam 304. The suppression will work for the class of optical path lengths through the fog 316 that are shorter than the coherence length of the beam 304. For a 0.001 nanometer (nm) bandwidth, 1-micron center wavelength light source, the coherence length will equal 1 m. Lasers with coherence lengths ranging from ~5 microns to 10 kilometers are widely commercially available. To achieve a longer GSR, longer coherence lengths are desired.

A target that is beyond the GSR should backscatter light normally and the total amount of light it returns to the imaging camera should remain unchanged. With the suppression of the glare associated with the fog volume within the GSR, the target can be expected to show up with an improved contrast. Interestingly, a target within the GSR would also have its scattering suppressed and is therefore not expected to show up in a glare suppressed image.

The movement of scatterers within the fog can disrupt the time-reversal scattering process. The inventors expect this influence to increase as a function of distance from the camera/DOPC unit. In combination with the scatterer movements, the reaction speed of the camera/DOPC would also influence the reversal/phase conjugation process. This implies that there is a maximum limit to GSR due to scatterer movements and camera/DOPC reaction time. However, this also means that a moving target within the GSR can also be expected to be observable as its motion will also disrupt the reversal process at its location. Finally, the inventors also note that the GSR for a fixed coherent length system can be reduced by intentionally mismatching the interferometer arm lengths of the DOPC system by the corresponding GSR shortening required.

In one or more embodiments, a suitable glare suppression system can be implemented using an imaging camera and a DOPC system with a response time of 100 milliseconds (ms) and the capability to manipulate $10^3$ optical modes.

In one or more embodiments, the glare suppression system can have a response time of 100 microseconds and a capability of manipulating 10 optical modes, e.g., allowing glare suppression while controlling only several optical modes (while also demonstrating a three orders of magnitude increase in system operating speed).

2. Camera Reference Sweep (CRS) Embodiment

The following camera reference sweep (CRS) approach represents another way to suppress glare at the imaging plane. The proposed experimental setup is pictured in FIG. 4.

Figure 4:
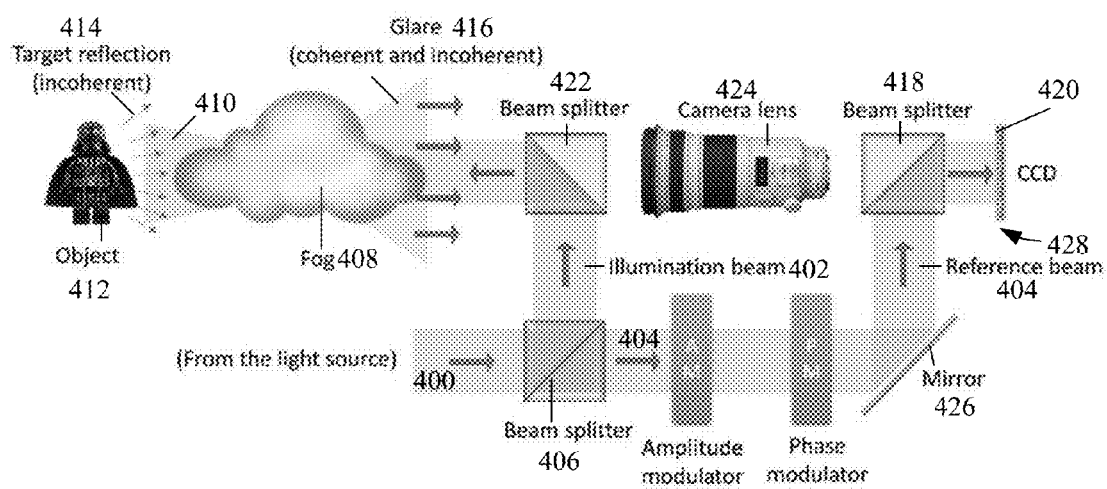
FIG. 4 shows and experimental setup for a camera sweep embodiment of the present invention, wherein arrows indicate light trajectories, a small fraction of light siphoned from the original laser light to form the reference beam having a reference light field (which is ideally planar), and the reference light field is then interfered with the scattered light field (of the glare) impinging on the camera (CCD).

FIG. 4 shows collimated light 400 from the laser is separated into an illumination beam 402 and reference beam 404 by a beam splitter 406. A portion of the reference beam is sent through an amplitude modulator (AM) and a phase modulator (PM) successively. The remaining portion of the illumination 402 is incident on the fog 408. The forward scattered light 410 goes through the fog 408, illuminates the target 412 (e.g., object), and is reflected to form reflected (incoherent) light 414 reflected from the target 412 back through the fog 408. The backscattered light backscattered from the fog 408 causes a glare 416 (comprising coherent and incoherent light). The target reflection 414 along with the glare 416 is combined with the reference beam 404 by another beam splitter 418. The reference beam 404 is then phase stepped and amplitude stepped through a full set of permutations using the AM and PM. At each image pixel 420, the lowest measured signal corresponds to the situation when the reference beam 404 and glare 416 are exactly destructively canceling each other, leaving only the reflection 414 from the object 412. By plotting the lowest measured signal for each pixel, a glare suppressed image of the target is generated. Also illustrated in FIG. 4 is a beamsplitter 422 directing the illumination beam 402 towards the fog 408 and object 412 and transmitting the glare 416 and target reflection 414 to a camera lens 424, wherein the camera lens 424 focuses the target reflection 414 and glare 416 onto the camera pixels 420. A mirror 426 is used to guide the reference beam 404 onto the camera pixels 420.

Due to the multiple scattering nature of the fog, the light trajectories that contribute to the glare 416 will have varying optical path lengths. Therefore, to ensure that the glare can be suppressed, a laser with an appropriately long coherence length is chosen to ensure that a significant fraction of these light trajectories will have optical path lengths shorter than the coherence length. In one or more embodiments, a laser having a 0.001 nanometer (nm) bandwidth and 1-micron center wavelength (providing a long coherence length equal to 1 m) is used to provide the reference beam 404 and the illumination beam 402 that is directed towards the fog 408 and the target 412 hidden behind the fog 408.

To ensure that the glare 416 at each pixel 420 is effectively canceled out, the camera should be set up in such a way that the camera pixel 420 size is smaller than $1.22\lambda/2NA$ (where $\lambda$ is the wavelength of light source and NA is the numerical aperture of the camera lens). This ensures that the light fields incident on each pixel 420 are effectively single mode in nature.

At each pixel 420, the light intensity can be expressed as:

$$I = |E_g + E_r|^2 + I_{target} + \text{Res}(I_g) = |E_g|^2 + |E_r|^2 + 2|E_g||E_r|\cos(\theta_g - \theta_r) + I_{target} + \text{Res}(I_g)$$

where $E_g$ and $E_r$ are the light fields from the glare 416 and reference light fields respectively (with relative phase angles $\theta_g$ and $\theta_r$, respectively), $I_{target}$ is the incoherent light's 414 intensity reflected from the object 412 back through the fog 408, and $\text{Res}(I_g)$ is the incoherent residual glare which remains unsuppressed by the system.

Note that in this equation, the minimum occurs when $\theta_g = \theta_r + \pi$, and $|E_g| = |E_r|$ at the point where the reference beam's 404 field is exactly cancelling the glare light field by matching its amplitude and phase (in opposition). At this minimum, the intensity measured is directly related to $I_{target}$ and $I_g$ (the glare 416 intensity). This means that the glare components that are within the coherence length will no longer be observable at the pixel 420.

To arrive at this minimum, one or more embodiments of the invention scan through a range of reference laser intensity and phase combinations until the minimum solution for each pixel is found. The process can be performed in parallel for all the image pixels at once by simply using an amplitude modulator AM and phase modulator PM to step the reference laser beam's 404 phase and amplitude through the permutations.

Then, by taking the measured $|E_g|$ and $\theta_g$ for each pixel, an image having a significant portion of the glare suppressed is rendered. As mentioned previously, the range in which this approach (glare suppression range, GSR) will work is dependent on the coherence length of the laser. In short, the suppression will work for the class of optical path lengths through the fog that are of length shorter than the coherence length of the beam 400 (which can range from ~5 microns to 10 kilometers for widely commercially available lasers). To achieve a longer GSR, longer coherence lengths can be used.

In the case that a very high bit depth camera (CCD) is available or $\text{Res}(I_g)$ is much smaller than $I_{target}$, it should also be possible to determine $|E_g|$ and $\theta_g$ without directly setting the reference beam's 404 field to exactly oppose the glare light field. In one or more embodiments of such a scenario, the reference beam 404 has its phase stepped at a fixed amplitude and the measurements are used to deduce the appropriate amplitude and phase values. However, this will only work if there is sufficient bit range and signal to noise ratio (SNR) to perform this indirect deduction.

The movement of scatterers within the fog can disrupt the process, and therefore the fog must be stationary during the measurement process. The inventors expect the influence of scatterer movement to increase as a function of distance from the laser/camera, implying that there is a maximum limit to the GSR due to scatterer movements.

While a target within the coherence length will not be observable, a moving target within the GSR should be observable as its motion will also disrupt the suppression process at its location. The GSR for a fixed coherence length system can be reduced by intentionally mismatching the interferometer arm lengths of the camera system by the corresponding GSR shortening required.

3. Coherence Gated Negation (CGN) Embodiment

CGN is capable of coherently suppressing glare through the use of destructive interference to allow improved imaging of a weak target. This method can operate over a length scale span that is limited only by the coherence length of available optical sources, which can range from micrometers (for superluminescent diodes) to kilometers (for fiber lasers). CGN shares its roots with acoustic noise cancellation [25]. The basic idea is to use a reference optical field of the same magnitude and opposite phase to destructively interfere with the glare component of a returning optical field to null out the glare and its associated noise, thereby allowing the electronic detector to measure only the optical signal from the hidden target. In the case of acoustic noise cancellation, the amplitude and phase of the unwanted signal can be separately measured and used as input in the cancellation process. In CGN, this luxury is not available as there is no prior knowledge of the glare optical field characteristics. Instead, a light source of suitable coherence length is employed such that (1) the glare optical field is coherent with the reference optical field and (2) the target reflection is incoherent. By permuting through a specific set of amplitude and phase values for the reference field, the condition for effective destructive interference is met within a certain error bound for one of the permutations. By screening for the minimum detected optical signal through the whole set, the signal reflected from the target is determined. When performed in an imaging context, this allows us to use a single permutation set operating over all the camera pixels at once to generate a glare suppressed image even if the optical field is highly disordered and speckled.

Using this approach, the ability to suppress the glare intensity by a factor of 10 times with the use of a permutation set of size 256 has been experimentally demonstrated. Our experimental design choice also allowed demonstration of glare suppression on the length scale of 2 mm—a regime that conventional time-of-flight methods are presently unable to reach. Our experiments further demonstrate CGN's ability to image targets at different depths without system alterations, and there are several scenarios where CGN can provide better target image quality than conventional coherence gating methods.

a. Apparatus

Figure 5:
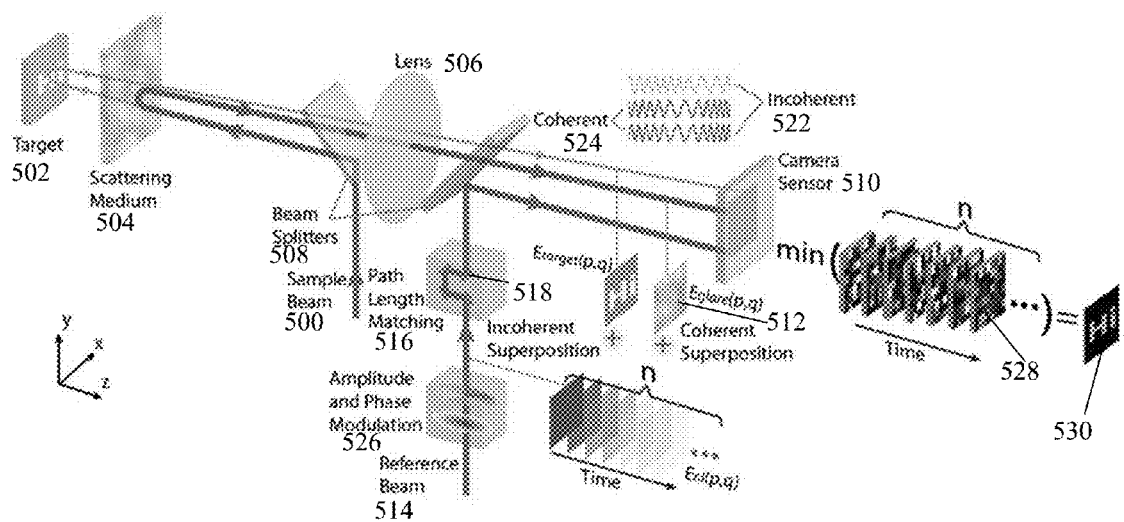
FIG. 5 illustrates the principle of the Coherence Gated Negation (CGN) technique according to one or more embodiments of the present invention, wherein The CGN system uses a laser as the illumination source for the active imaging system. With the presence of a scattering medium, a significant portion of the light is backscattered to the camera that images the target. A plane-wave reference beam, with path length and polarization matched to the backscattered light (glare), is used to cancel the glare by destructive interference. In this case, both the amplitude and phase of the reference beam are stepped to cover a significant dynamic range of the glare and combine each of them with the glare, respectively, resulting in a set of speckle images from the camera. By taking the minimum intensity of each pixel vector along the time axis of the speckle image set, the image of the target is reconstructed with significant glare suppression.

FIG. 5 illustrates a CGN system comprising a laser beam (sample beam 500) illuminating a two dimensional target 502 located behind a scattering sample/medium 504. The returning light 506, which consists of light that is backscattered by the scattering medium 504 as well as light reflected from the target 502, is captured by the imaging system (comprising lens 506, beamsplitter 508, and camera sensor 510), resulting in an image 512 of the target 502 obscured by glare. On the camera sensor chip 510, the captured optical field is the superposition of the glare $E_{glare}(p,q)$ and the target reflection $E_{target}(p,q)$, where p and q are the pixel numbers in the x and y directions, respectively. To realize CGN, a collimated reference beam $E_{r,i}(p,q)$ 514 is added on the camera 510 by a beam splitter 508 to interfere with $E_{glare}(p,q)$ and $E_{target}(p,q)$. Path length matching 516 of the glare contribution 512 and the reference beam 514 is performed using a sequence of mirrors 518. Choosing the coherence length of the laser source (emitting beams 500 and 514) appropriately makes the glare contributions from the extended scattering medium 504 in coherence 520 with the reference beam 514. As long as the optical path length of the target reflection 522 is substantially different from the majority of the optical path lengths of the glare components, the target reflection 522 will not be in coherence 524 with the reference beam 514. The reference beam is then permuted through a series of phase and amplitude values. The observed image intensity for the $i^{th}$ image $I_i(p,q)$ can be expressed as $$I_i(p,q)=|I_{target}(p,q)+|E_{glare}(p,q)+E_{r,i}(p,q)|^2$$

where $I_{target}(p,q)=|E_{target}|^2$ is the target intensity.

Imaging performed in such a way that the image speckle size is greater than the camera pixel size ensures that there are no phase variations across the surface of any given pixel. In this case, the minimum value that $I_i(p,q)$ can take is $I_{target}(p,q)$, which occurs when $E_{r,i}(p,q)$ is of the same magnitude and opposite phase of $E_{glare}(p,q)$ (destructive interference) that is, $|E_{glare}(p,q)+E_{r,i}(p,q)|^2=0$. As such, by permuting through different phase and amplitude values for $E_{r,i}(p,q)$ using amplitude and phase modulation/modulators 526, $I_{target}(p,q)$ for each image pixel is determined simply by taking the smallest or minimum (min) $I_i(p,q)$ measured through a set of n (n is an integer) reference field permuted images 528. As the glare cancellation is performed in the optical regime, CGN can allow detection of the target (and formation of image 530 of the target 502) without any noise consideration from the glare at all.

In practice, the inventors do not expect complete destructive interference to occur as the glare optical field's phase and amplitude are continuously distributed, while the modulation of the reference phase and amplitude can only be performed in a discrete fashion. The greater the permutation set, the more effectively we can suppress the glare at the price of longer data collection time.

a. Experimental Demonstration of Glare Suppression with CGN

Figure 6A:
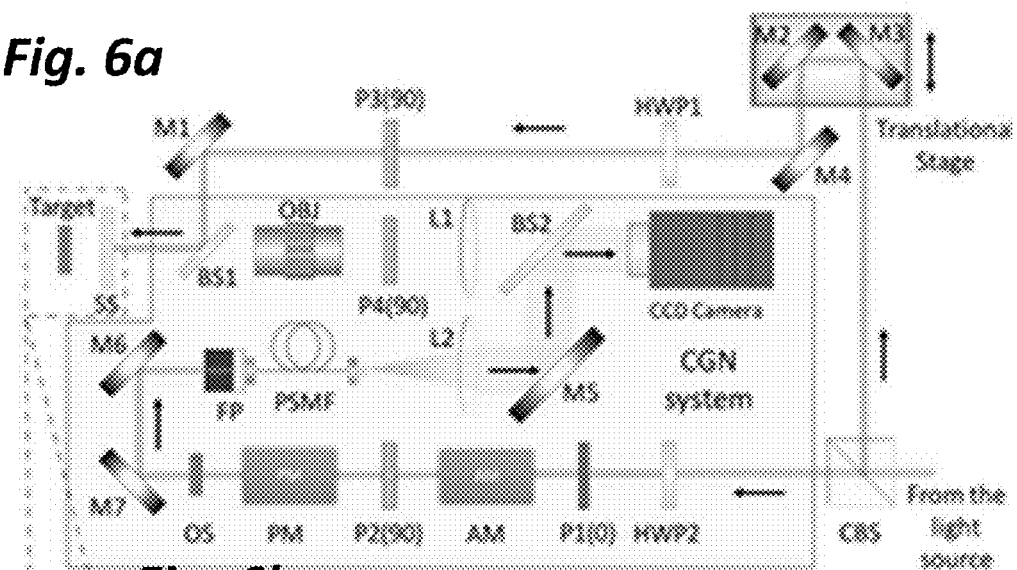
FIG. 6(a) is an experimental setup for Coherence Gated Negation (CGN) CGN according to one or more embodiments of the present invention, wherein AM is amplitude modulator; BS is beam splitter; CBS is cubic beam splitter; FP is fiber port; HWP is half-wave plate; L1-L2 are lenses; M1-M6 are mirrors; OBJ is objective lens; OS is optical shutter; P is polarizer; PM is phase modulator, and PSMF is polarization-maintaining single mode fiber.
Figure 6B:
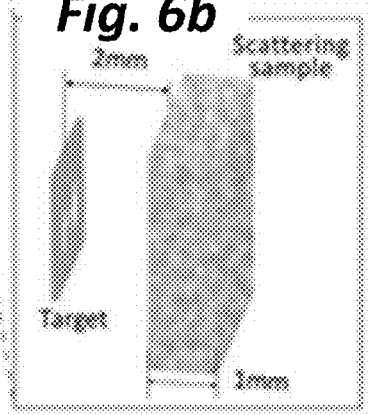
FIG. 6(b) is a schematic of the scattering medium.
Figure 6C:
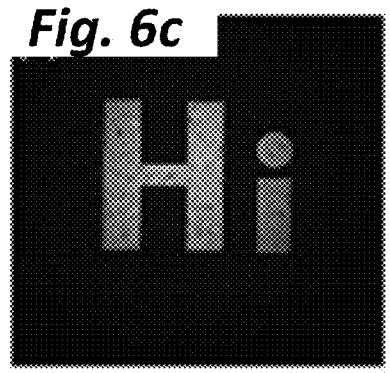
FIG. 6(c) is an image of the target without glare, according to one or more embodiments of the present invention.

To validate the CGN method, the experimental setup shown in FIG. 6(a) was implemented. A continuous-wave laser (MGL-FN-532, Opto Engine, 532 nm wavelength, ~1 mm coherence length) was used as the light source. Light from the laser was split into a reference and sample beam by a beam splitter (CBS). The sample beam illuminated the target, which was placed 2 mm behind the scattering sample (SS) [shown in FIG. 6(b)]. The scattering sample [15 mm(x)×25 mm(y)×1 mm(z)] consisted of polystyrene particles (3 µm in diameter) in a gel phantom (concentration $6.8\times10^7$ ml$^{-1}$). The backreflected light consisted of reflections from the target and glare from the scattering sample. On the other optical path, the reference beam was passed through an amplitude and phase modulator, spatially filtered, and collimated into a plane wave. The collimated reference beam illuminated the camera sensor chip at normal incidence. The reflected light from the target and the glare propagating through BS1 were captured by an objective lens (OBJ), filtered to a single polarization, and imaged by a tube lens (L1) onto the camera. The optical field's effective angular range was 6.3 deg. This translates to an optical speckle spot size of 19.2 µm at the sensor. In comparison, the camera pixel size is 4.54 am. This allowed us to enforce the CGN operating requirement that the phase not vary substantially across any given pixel's surface. By path length matching, the collimated reference beam only interfered with the glare but not the reflection from the target.

Figure 6D:
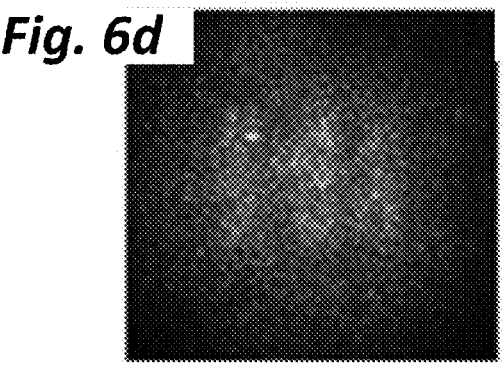
FIG. 6(d) is an image of the target with glare before CGN.
Figure 6E:
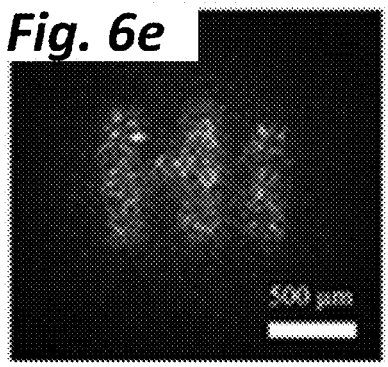
FIG. 6(e) Image of the target after CGN according to one or more embodiments of the present invention.

Before CGN was applied, an optical shutter (OS) blocked the reference beam, and an image of the target occluded by glare was captured as shown in FIG. 6(d). The optical shutter was then opened and CGN applied. The reference beam was modulated through all permutations of eight amplitude values and 32 phase values successively. The eight amplitude values were chosen to be A(π/8), respectively, where n=1-8 and A is the 99th percentile value of the glare amplitude. For the phase, the 32 values simply divide 0 to 2π radians equally. After the reference beam went through all the permutations, a glare suppressed CGN image was acquired [FIG. 6(e), Visualization 1]. Comparing the images before CGN [FIG. 6(d)] and after CGN [FIG. 6(e)], the previously obscured target can be clearly discerned. To quantify the glare suppression ability of the CGN technique, the glare suppression factor is defined as the ratio between the mean intensity of the glare before and after the CGN process. Through a null target experiment, the glare suppression factor was determined to be ~10 for this experiment. Unsurprisingly, the glare wavefront was highly disordered. The glare wavefront as determined by the CGN process is reported in Supplementary information [42].

As discussed earlier, the glare suppression factor is directly determined by the size of the permuted set of reference amplitude and phase values. An experiment to measure the glare suppression factor with different numbers of steps in the reference field phase and amplitude was performed. To eliminate the influence of laser coherence for residual glare intensity, a laser with a long coherence length (Excelsior 532, Spectra Physics, 532 nm wavelength, >9 m coherence length) was used in this experiment.

Figure 7A:
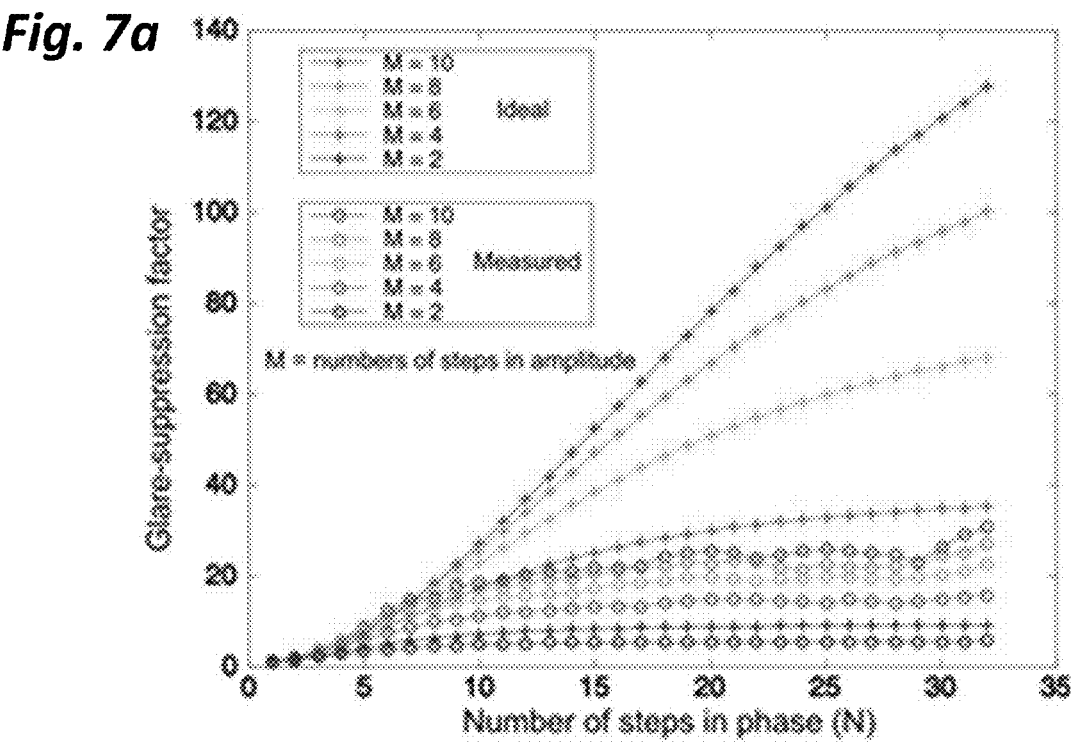
Figure 7B:
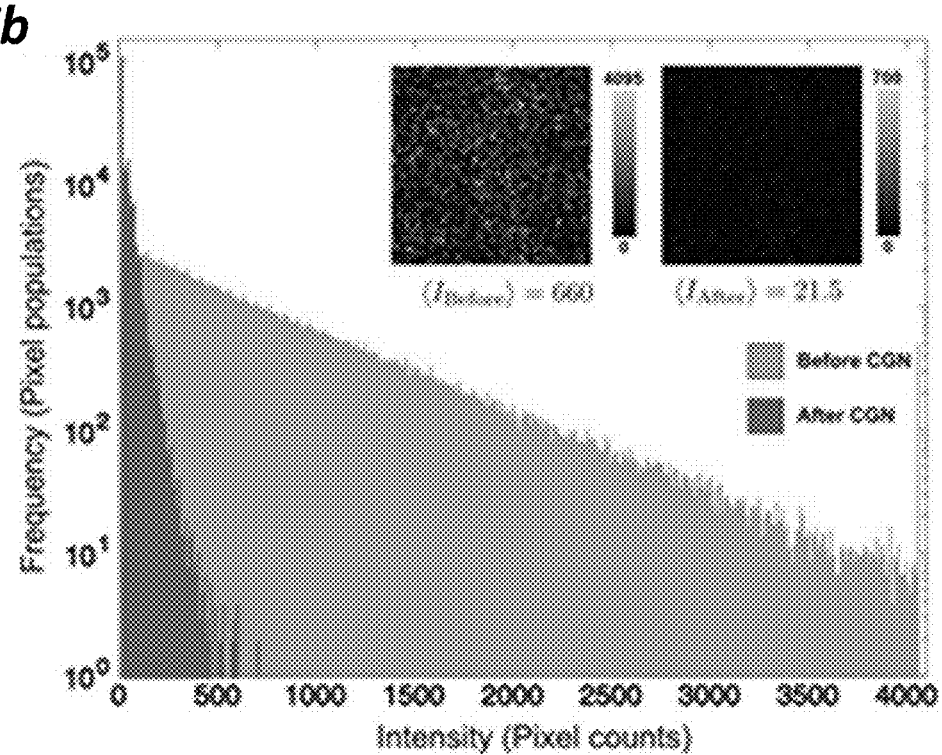

A series of glare suppression factors was measured through CGN experiments with a null target but the same scattering medium [15 mm(x)×25 mm(y)×1 mm(z)] consisting of polystyrene particles (3 µm in diameter) in a carrageenan gel phantom (concentration $6.8\times107$ ml$^{-1}$). Following the aforementioned strategy, the number of amplitude steps was varied from 1 to 10 and the number of phase steps was varied from 1 to 32. The full chart is shown in Supplementary Information [42]. Plots of selected combinations are included in FIG. 7(a). For comparison, the expected CGN factor computed through an idealized simulation is shown as well (see Supplementary Information [42] for details). The mismatch between the measured and ideal CGN factors can be attributed to (1) phase jitter in the reference beam and sample beam due to vibration in the system, (2) noise in the electronics including the laser and electrooptical modulator, and (3) the limited extinction ratio of the amplitude modulator and polarized optics, etc. FIG. 7(b) shows a histogram of the glare intensity before and after CGN for the situation in which we permute through 10 amplitude steps and 32 phase steps. In this case, a glare suppression factor of ~30 was experimentally achieved b. Comparison of Coherence Gated Negation and Coherence Gating By only detecting the optical field component that is coherent with the reference field, conventional coherence gating methods can also reject glare. However, the ways in which conventional coherence gated (CG) and CGN imaging methods work are opposite in nature. While CG imaging methods are good at "gating in" an optical field originating from a specific chosen distance, CGN is good at "gating out" the glare optical field. These different approaches to imaging in the presence of scattering and glare lead to two key distinctions between conventional CG methods [26-28] and the CGN approach according to one or more embodiments of the present invention.

The first key distinction between CG and CGN is that CG methods reject glare contributions as well as any other potential optical signals of interest outside the coherence window. In comparison, CGN can permit the detection of all optical signals that do not share the same coherence window as the glare components.

This distinction is practically important. In a scenario where there are two objects at different distances behind a fog, a CG method, such as coherent light detection and ranging (LiDAR), is only able to detect one object at a given time. Another class of CG methods, based on spectral sweeping, such as swept source optical coherence tomography [27], can perform simultaneous depth-ranging of multiple objects. However, such methods are intrinsically limited in their range span. Moreover, if the object's distances are unknown, the coherent LiDAR system would have to be exhaustively range-scanned to find the objects. In comparison, by working to suppress glare, CGN permits direct observation of all objects at any range beyond the glare suppression region. However, this advantage does come with a compensating disadvantage-CGN is not capable of providing depth information of the objects.

To demonstrate CGN's advantage over CG in this aspect, the following experiment was performed. As shown in FIG. 8(a), following the aforementioned procedure, CGN was applied to the target located at different positions A, B, and C, which correspond to 1, 2, and 3 mm behind the scattering sample, respectively. Since CGN works by coherently gating out the glare component of the light, no adjustment is required to adapt to the depth change of the target, as long as the target remains within the depth of field of the imaging system. The experimental results are displayed in FIGS. 8(b)-8(g). FIGS. 8(b)-8(d) show images of the target captured before glare suppression, while FIGS. 8(e)-8(g) show images captured after glare suppression. From their comparison, we can easily discern that glare is suppressed and the visibility of the target is enhanced.

The second key distinction between CG and CGN is that if an element contributing glare and a weak target object both lie within the coherence envelope of the light source, CGN can actually provide a superior signal-to-background image of the object.

To clearly and simply explain this point, the inventors consider a scattering sample as the glare contributor and a weak target placed at a distance L away from the CGN system [as shown in FIG. 9(b)].

Here the coherence length of the light source is C, and L is set to be shorter than C (L<C). Under CGN operation according to one or more embodiments of the present invention, the path length is adjusted to match the reference beam with the glare contribution. CGN will completely suppress the glare in this situation. As the target is partially coherent, the inventors would expect a diminished signal associated with the target as only the incoherent portion of the target will contribute to image formation. In contrast, conventional CG operation would match the reference beam path length to the target. This results in the detection of the target as well as a partial contribution from the coherent component of the glare. In aggregate, the CGN detection scheme results in a depressed target signal with no glare background, which is more desirable than the CG case in which a glare background is present. This result is also valid over the range of extended scattering media.

To demonstrate CGN's advantage, the inventors performed the following experiment. As shown in FIG. 9(a), a thin scattering medium (15 mm(x)×25 mm(y)×0.5 mm(z)) consisting of polystyrene particles (3 μm in diameter) in a gel phantom (concentration $6.8 \times 10^7$ ml$^{-1}$) was attached directly on the top of a reflective target. CGN was applied after the path length of the reference beam was matched with the glare as shown in FIG. 9(b).

Images of the target acquired before and after CGN are included in FIGS. 9(c) and 9(d), respectively. After these images were acquired, the path length of the reference beam was adjusted to match the reflection from the target, and phase shifting holography [29] was applied as a demonstration of a CG approach. The retrieved intensity map from this procedure is shown in FIG. 9(e).

In this series of experiments, the differences and advantages of CGN compared to hardware-based time-of-flight glare reduction systems and conventional coherence gating methods were demonstrated. CGN's ability to suppress glare over optical distances as short as several micrometers through the use of low-coherence light sources, such as superluminescent diodes, contrasts favorably compared to conventional time-of-flight hardware. It was also shown that, by suppressing glare and permitting all other optical signals to pass, CGN allows for the simultaneous imaging of objects at different distances. In contrast, CG methods are good at imaging objects at a given distance and rejecting optical contributions before and after the chosen plane. It was further shown that CGN can outperform CG methods in image quality under certain conditions—specifically, when the glare components and the target optical field are within the same coherence window of the interferometer.

c. Applications

At the current time, the CGN method can only be used to assist the imaging of amplitude objects. While the inventors do not see a straightforward way to extend CGN to enable phase imaging, the inventors do not preclude the possibility of such developments in the future.

The CGN design for a specific application will be application dependent. For example, in the scenario in which it is desired to cancel glare from a fast changing scattering medium, one or more embodiments of the present invention would likely need both a fast camera and a fast reference field permutation apparatus. One solution may be to directly measure the amplitude and phase of the glare wavefront using holography and then play back the appropriate field to negate the glare in a single step without iteration. However, this method will still be relatively slow since it needs a camera. Furthermore, it would likely be very challenging to implement since it requires the ability to simultaneously control both the amplitude and phase of the wavefront across the full frame. In order to achieve a faster implementation, one or more embodiments of the present invention may instead choose to perform CGN on a pixel-by-pixel basis rather than a full-frame basis. Pixel-by-pixel CGN would focus on a single pixel and iteratively derive the correct reference cancellation field quickly using a fast single pixel detector such as a photodiode. In an ideal situation, only a few measurements would be needed to arrive at the correct field [30,31]. CGN performed in this way can progressively work through all the image pixels. As long as the time taken to optimize glare suppression for each pixel is shorter than the time scale at which the scattering medium is decorrelating its optical field, the inventors expect to suppress glare effectively.

e. Experimental Methods Used in the CGN Experiments

1. Sample Preparation

Polystyrene microspheres with a mean diameter of 3 μm (Polybead Microsphere, Polysciences, Inc.) were mixed with a 1.5% carrageenan gel in aqueous phase. The mixture was cast in a mold of size 15 mm×25 mm, with a thickness of 1 or 0.5 mm. The medium had a scattering coefficient of $\mu_s = \sigma_s \times N = 1.3$ mm$^{-1}$ and a reduced scattering coefficient of $\mu_s' = 0.2925$ mm$^{-1}$ as calculated via Mie scattering theory, where the density of the microspheres N was $6.8 \times 10^7$ ml$^{-1}$ and the scattering cross section $\sigma_s$ was 18.7 μm$^2$. The ballistic transmission of the sample was measured to be 23%, which agrees with the theoretically predicted value.

The target was made by attaching a positive mask showing letters "Hi" to an optical mirror. The height of the letter "H" was 1 mm.

2. Setup Used in the CGN Experiments

The experiment was carried out on a custom-built setup as depicted in FIG. 6(a). A continuous-wave laser (MGL-FN-532, Opto Engine) with a wavelength of 532 nm and a coherence length of ~1 mm (see Supplementary information [42] for detailed measurement) was used as the light source to illuminate the target. A laser with a long coherence length (Excelsior 532, Spectra Physics, 532 nm wavelength, >9 m coherence length) was used only for characterizing the glare (FIG. 7(a)-7(b)). Light from the laser was split into a reference beam and a sample beam by a beam splitter (CBS). The sample beam illuminated the target at 2 mm behind the scattering sample (SS) [shown in FIG. 6(a)]. Light reflected from the target and the glare propagating through a beam splitter (B S1) were captured by an objective lens (OBJ, M Plan Apo 2×, NA 0.055, Mitutoyo), linearly polarized, and imaged by a tube lens (L1) on to the camera (resolution, 1936(H)×1456(V); pixel size, 4.54 m×4.54 m; Prosilica GX 1920, Allied Vision). The optical field's effective angular range was 6.3 deg. This translates to an optical speckle spot size of 19.2 m on average at the sensor (pixel size 4.54 μm). The reference beam was modulated by an amplitude modulator (EO-AM-NR-C4, Thorlabs) and a phase modulator (EO-PM-NR-04, Thorlabs) through permutations of eight amplitude steps and 32 phase steps successively. The polarization direction of the reference beam was aligned with the sample beam. The reference beam was spatially filtered, collimated into a plane wave, and coupled to the camera in the normal direction using a beam splitter (BS2). The path length of the reference beam matched with that of the light reflected from the scattering sample.

4. Pixel Reference Sweep (PRS) Embodiment

In one or more embodiments, the glare suppression performed using a camera requires sweeping the reference laser power and phase over a broad two dimensional (2D) choice space. This is a time-consuming process. In some circumstances (particularly when faced with a fog that is changing in time), it may not be possible to successfully scan through all the possible permutations in the 2D space within the time window available.

An alternate approach for performing glare suppression comprises replacing the camera (CCD) with a single photodetector having a photosensitive area that is equal or smaller than an imaged speckle size. Then, to form an image, the image plane is raster-scanned across the photodetector or vice-versa. In this approach, a fast determination of the correct reference laser phase and amplitude can be performed using a feedback approach and the correct solution can be determined with far fewer measurements. One specific approach phase steps the reference light field through 3 increments and calculates the correct phase. Then, the reference beam is shifted to the correct phase and the amplitude is varied until a minimum detected interference signal is reached, indicating that the maximum suppression point has been reached. In this scheme, the glare can be suppressed with as few as 5 measurements.

Upon successful glare-suppressed measurement of the target for a given point in the imaging plane, the photodetector can be shifted and the process repeated for the next point.

The PRS approach has two important engineering advantages. Firstly, the number of measurements (e.g., ~5) required to arrive at a glare-suppressed solution using the PRS method is smaller and therefore the PRS method quickly arrives at the correct $|E_g|$ and $\theta_g$ for each image point. As a result, fog movement is less of a problem here. Secondly, a photodetector has a far larger dynamic range than a camera.

Figure 10:
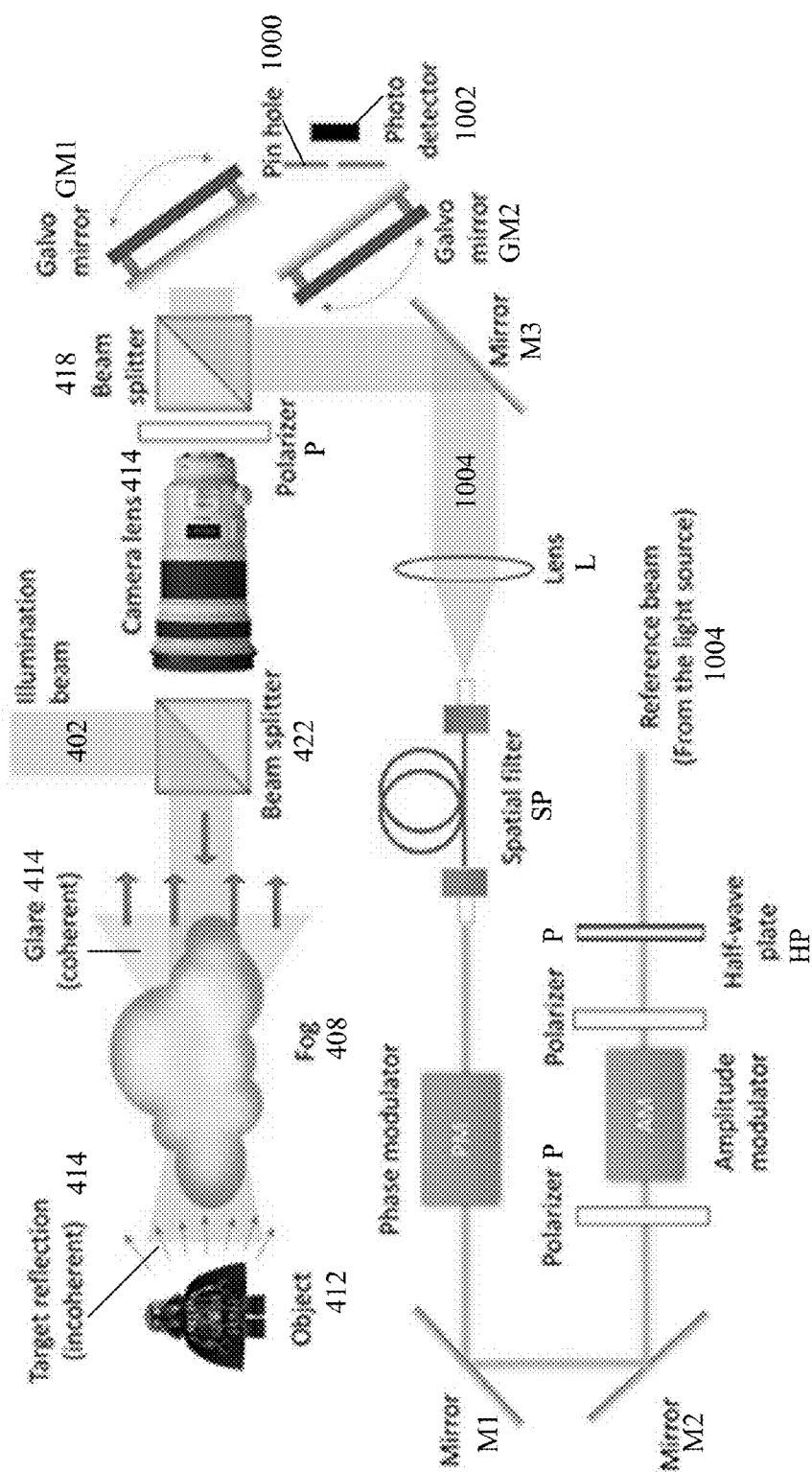
FIG. 10 is a schematic illustrating a system for suppressing glare using pixel reference sweep according to one or more embodiments of the present invention.

FIG. 10 illustrates a setup for a pixel sweep approach, wherein a pin hole 1000 is used to limit the size of the speckle that impinges on the photodetector 1002 and the signal on the photodetector can be expressed as $$I=|E_s+E_r|^2=I_s+I_r+2|E_s||E_r|\cos(\theta_s-\theta_r)$$

where $E_s$ is the electric field of the speckle, $I_s$ is the intensity of the speckle, $E_r$ is the electric field of the reference beam 1004, and $I_r$ is the intensity of the reference beam 1004.

Then, the reference beam 1004 is stepped through a series of phases: 0, pi/2 and pi, and three intensities $I_0$, $I_{\pi/2}$, and $I_\pi$ (for each phase 0, pi/2 and pi) are captured on the photodetector 1002.

The three intensities are:

$$I_0=I_s+I_r+2|E_s||E_r|\cos(\theta_s-\theta_r)$$

$$I_{\frac{\pi}{2}} = I_s + I_r + 2|E_s||E_r|\cos\left(\theta_s - \theta_r - \frac{\pi}{2}\right)$$

$$I_\pi=I_s+I_r+2|E_s||E_r|\cos(\theta_s-\theta_r-\pi)$$

So that $$|E_s||E_r|\cos(\theta_s - \theta_r) = \frac{I_0 - I_\pi}{4} \quad |E_s||E_r|\sin(\theta_s - \theta_r) = \frac{I_{\frac{\pi}{2}}}{2} - \frac{I_0 + I_\pi}{4}$$

The $|E_r|$ can be measured beforehand. Then:

$$E_s = |E_s|\cos(\theta_s - \theta_r) + i|E_s|\sin(\theta_s - \theta_r) = \frac{I_0 + I_\pi}{4|E_r|} + i\frac{\frac{I_{\frac{\pi}{2}}}{2} - \frac{I_0 + I_\pi}{4}}{E_r}$$

In one or more embodiments of this process, 3 steps were taken to measure the complex field of the speckle $E_s$. After that, the reference beam 1004 is simply modulated to the sample amplitude of $E_s$ (e.g., the same amplitude as for $E_s$ in the above formula) but with the opposite phase to cancel the complex field of the speckle $E_s$. As a result, the $4^{th}$ measurement will give the intensity of the pixel after glare suppression.

Also shown in the PRS system embodiment of FIG. 10 are mirrors M1, M2, M3, Galvo mirrors GM1, GM2, for guiding the laser beams, polarizers P, spatial filters SP, and lens L.

Advantages and Improvements

When the object is illuminated through the fog, a strong glare 318 due to the backscattering of light 304 from the fog 316 prevents us from seeing the object. In an embodiment of FIG. 3, the DOPC system captures the backscattered wavefront 312 generated by the fog 316 and changes the phase of half the optical modes in the playback wavefront 314 by a phase of pi to form a destructive interference at the pixel 302a of the imaging camera (CCD). This effectively suppresses the glare 318 from the fog and allows us to resolve the object behind the fog.

In another embodiment, illustrated in FIG. 4 (e.g., the CRS method), the phase and/or amplitude of a reference beam irradiating the imaging camera pixels 420 is modulated such that the glare is sufficiently suppressed.

The CGN method uses destructive optical interference to suppress glare and allows improved imaging of a weak target. CGN permutes through a set range of amplitude and phase values for a reference beam interfering with the optical field from the glare and target reflection, resulting in the glare being suppressed by an order of magnitude, even when the optical wavefront is highly disordered. This strategy significantly departs from conventional coherence gating methods in that CGN actively "gates out" the unwanted optical contributions while conventional methods "gate in" the target optical signal. The inventors further show that the CGN method can outperform conventional coherence gating image quality in certain scenarios by more effectively rejecting unwanted optical contributions.

To enable glare suppression via the CRS and DOPC methods, a laser is provided that emits light having a sufficiently narrow band such that its coherence length is long. As discussed above, the inventors expect the illumination beam's 402 laser light to multiply scatter within the fog and cause the light returning from the fog towards the imaging camera to create the glare 416. Light that reaches the target 412 and is reflected back through the fog to the camera (CCD) can be expected to be weak (masked by the glare 416). However, as long as the optical path lengths associated with the trajectories to the sample/target and back are longer than the coherence length of the laser, this coherence difference can be exploited to suppress the glare.

In addition, embodiments of the present invention (including the DOPC, CRS, and PRS examples) have the following advantages.

- The methods according to one or more embodiments of the present invention are unlike other existing wavefront shaping imaging methods [33,34] in that the methods do not require all of the scatterers between the observer and the target to be stationary. Instead, the methods according to one or more embodiments of the present invention work to reduce glare in the immediate region ahead of the observer—in a volume where the scatterers are sufficiently stationary.
- Unlike interferometer ranging methods [35], one or more embodiments of the present invention provide imaging capability ranging from the GSR to infinity. Conventional ranging methods require one to specify the approximate range at which the targets are expected to be located (within a coherence length).
- One or more embodiments of the present invention work in the presence of ambient light. In one or more embodiments, appropriate filters are placed to screen out all of the ambient light and permit only light used by the imaging system (e.g., imaging camera 300 and DOPC) to be transmitted.
- One or more embodiments of the present invention may achieve a GSR of 10 m.
- One or more embodiments of the present invention may perform glare-free imaging at a frame rate of 1 frame (100×100 pixels) per second.
- One or more embodiments of the present invention perform glare-suppressed imaging so that a target (that is undetectable without the glare-suppression imaging) can be observed.

Process Steps

Figure 11:
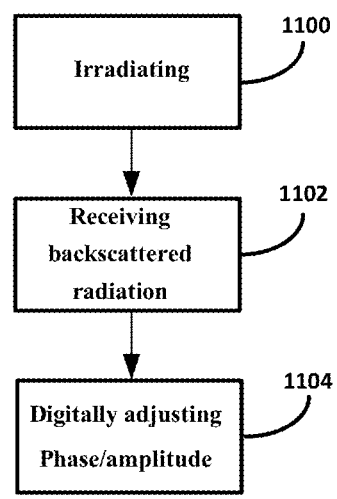
FIG. 11 is a flowchart illustrating a method of imaging an object behind a scattering medium, according to one or more embodiments of the present invention.

FIG. 11 illustrates a method of imaging an object behind a scattering medium according to one or more embodiments of the present invention. The method comprises the following steps (referring also to FIG. 3 and FIG. 4).

Block 1100 represents irradiating a scattering medium 316, 408 and an object 320, 412 behind the scattering medium with electromagnetic radiation 304, 402 (including, but not limited to, electromagnetic radiation having visible or infrared wavelengths). The scattering medium backscatters a first portion 416 of the electromagnetic radiation forming backscattered radiation 416. The object reflects a second portion 414 of the electromagnetic radiation forming imaging radiation. The scattering medium can be a solid, liquid, or gas, or a combination thereof. In one or more embodiments, the scattering medium is biological tissue comprising one or more biological cells. In one or more embodiments, the scattering medium comprises atmosphere. In one or more embodiments, the scattering medium comprises water vapor. In one or more embodiments, the scattering medium comprises fog. In one or more embodiments, the electromagnetic radiation is laser radiation or light.

Block 1102 represents receiving the backscattered radiation and the imaging radiation on one or more camera/sensor pixels 420, 302a.

Block 1104 represents digitally adjusting a phase and/or amplitude of reference electromagnetic radiation 404, 330 transmitted onto the one or more camera/sensor pixels 420, 302a, wherein the reference electromagnetic radiation 404 destructively interferes with the backscattered radiation on the one or more camera/sensor pixels 302a, 420 while the object 320, 412 is imaged on the one or more camera pixels 420, 302a using the imaging radiation 414. In one or more embodiments, the reference electromagnetic radiation destructively interferes with the backscattered radiation such that the glare on the pixels 420, 302a is suppressed below a desired level, e.g., such that the object 320, 412 is visible in an image formed in the camera CCD. In one or more embodiments, the reference radiation and the backscattered radiation have fields or wavefronts on the sensor pixels 420, 302a that at least partially cancel each other out.

Figure 12:
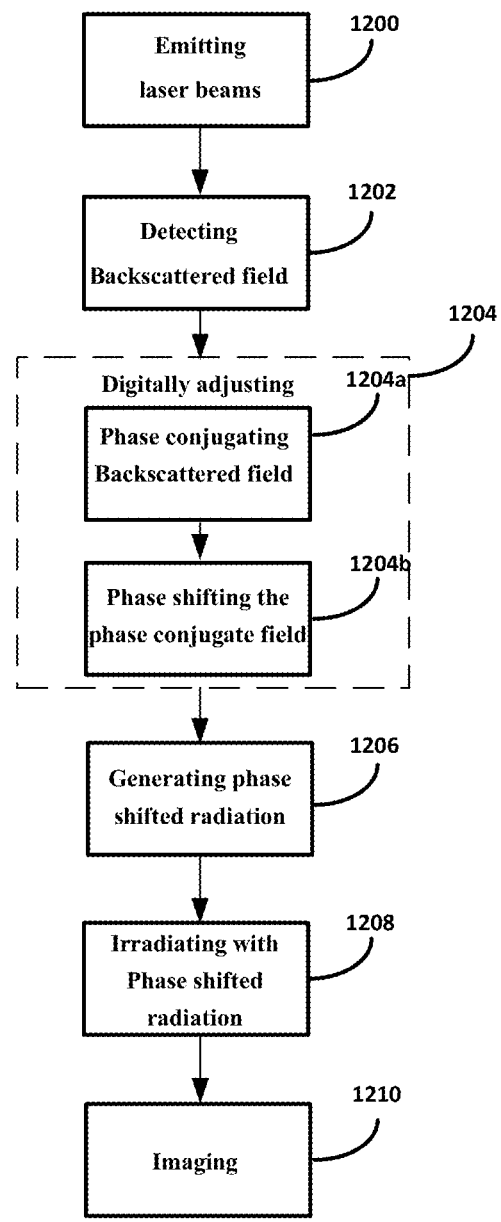
FIG. 12 is a flowchart illustrating a method of imaging an object behind a scattering medium using optical phase conjugation, according to one or more embodiments of the present invention.
Figure 13:
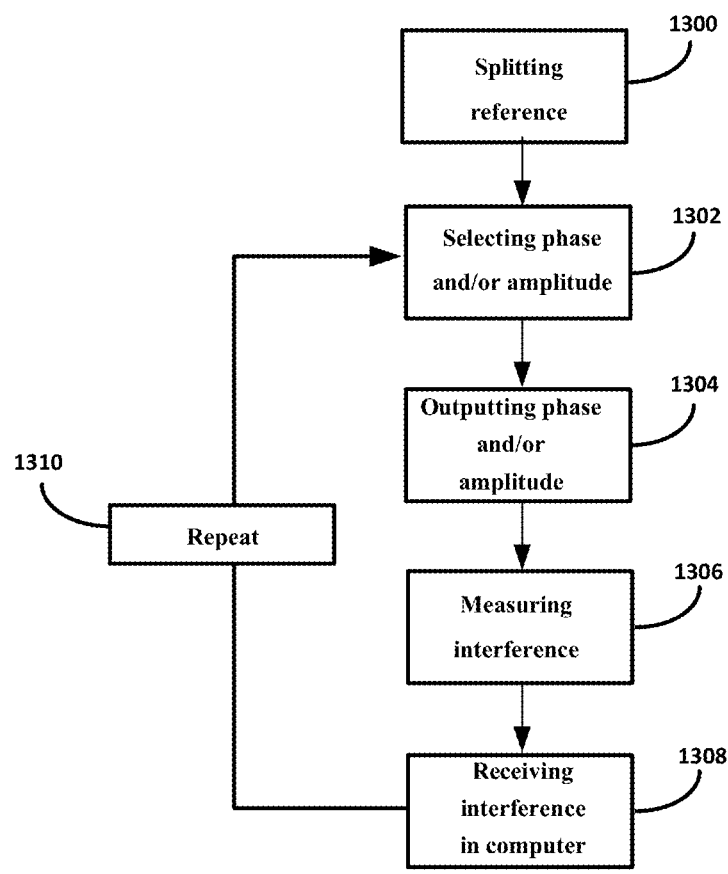
FIG. 13 is a flowchart illustrating a method of imaging an object using a camera sweep approach according to one or more embodiments of the present invention.
Figure 14:
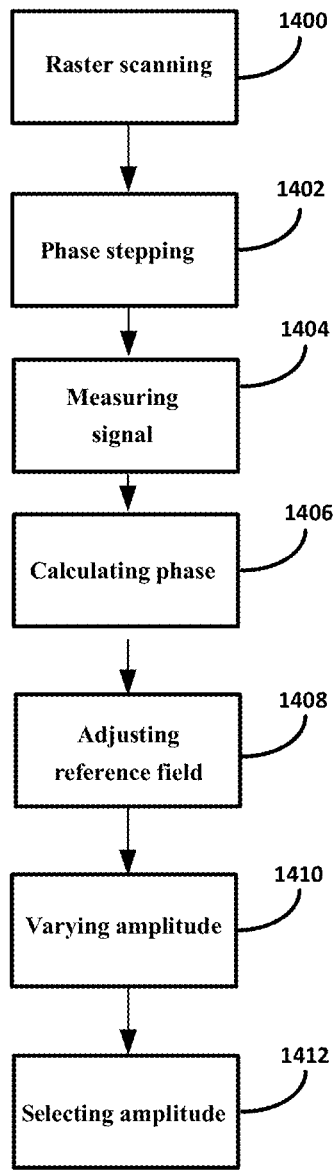
FIG. 14 is a flowchart illustrating a method of imaging an object using a pixel sweep approach according to one or more embodiments of the present invention.

FIGS. 12-14 illustrate various embodiments of the method of FIG. 11.

a. Glare Suppression Using an Optical Phase Conjugation

FIG. 12 illustrates a method of imaging an object behind a scattering medium according to one or more further embodiments. The method comprises the following steps.

Block 1200 represents emitting electromagnetic radiation 304 from one or more laser beam sources, each of the laser beam sources 302b optically located at the same image plane 310 position as a different one of the sensor pixels 302a (e.g., the laser beam sources 302a are each at position on an image plane 310 that is optically equivalent to the position of one of the sensor pixels 302a on an equivalent image plane 310). In one or more embodiments, the laser beam sources are formed by reflecting a laser beam from pixels 302b of a DMD, wherein each of the DMD pixels 302b are aligned (1:1 pixel to pixel match) and imaged onto one of the camera sensor pixels 302a.

The scattering medium 316 backscatters a first portion of the electromagnetic radiation 304 forming backscattered radiation. The object 320 reflects a second portion of the electromagnetic radiation 304 forming imaging radiation.

Block 1202 represents measuring a backscattered field of a portion of the backscattered radiation 318. In one or more embodiments, the backscattered field 312 is measured at the camera (CCD) through a 4-phase shifting based digital holography method [9].

Block 1204 represents digitally adjusting the backscattered field/wavefront (e.g., in the DOPC device). The digitally adjusting comprises phase conjugating (Block 1204a) the backscattered field/wavefront 312, forming a phase conjugate field; and phase shifting the phase conjugate field (Block 1204b), forming a phase shifted field or wavefront 314. In one or more embodiments, the phase conjugate field 314 is calculated as the complex conjugate of the backscattered field/wavefront 312 and the phase shifted field/wavefront 314 is calculated by shifting (or incrementing) the phase of the phase conjugate field by a number of degrees $\theta$ (e.g., wherein $0<\theta\leq\pi$ radians, for example).

Block 1206 represents generating phase shifted radiation having the phase shifted field or wavefront 314. In one or more embodiments, reflection of the reference beam 330 from appropriately modulated pixels on a SLM/DMD forms the reflection comprising the phase shifted radiation having the phase shifted field or wavefront 314.

Block 1208 represents irradiating the scattering medium 316 with the phase shifted radiation, wherein the phase shifted radiation scatters off the scattering medium 316 forming the reference radiation that destructively interferes with the backscattered radiation 318 on the one or more sensor pixels 302a while the object is imaged on the pixels 302b in Block 1210. In one or more embodiments, the fields/wavefronts of the reference radiation and the backscattered radiation at least partially cancel out on the pixels 302a so that a glare suppressed image of the object 320 is obtained on the pixels 302b.

In one or more embodiments, steps 1200-1210 are performed within 5 seconds (e.g., within a timescale for scatterer position shifts in the scattering medium).

In one or more embodiments, the DOPC device comprises the camera (CCD) detecting the backscattered field; and the SLM or DMD imaged pixel by pixel onto the camera.

b. Camera Reference Sweep (CRS) Process

FIG. 13 illustrates a method of digitally adjusting a phase and/or amplitude of reference radiation 404 in a camera sweep process.

Block 1300 represents splitting reference electromagnetic radiation 404 and object electromagnetic radiation 402 from a beam of electromagnetic radiation 400 prior to irradiating the scattering medium 408 and the object 412 with the object electromagnetic radiation 402. The scattering medium 408 backscatters a first portion of the object electromagnetic radiation 402 forming backscattered radiation 416. The object 412 reflects a second portion of the object electromagnetic radiation forming imaging radiation 414. The reference electromagnetic radiation 404 does not interact with the scattering medium 408 or the object 412. In one or more embodiments, the electromagnetic radiation is laser radiation or light.

Block 1302 represents selecting, in one or more computers, a phase and/or amplitude or increment of phase and/or amplitude.

Block 1304 represents outputting the phase, amplitude, and/or increment to one or more modulators AM, PM modulating the reference electromagnetic radiation 404, wherein the modulators AM, PM transmit/set the reference electromagnetic radiation with a reference field corresponding to the phase, amplitude, and/or increment selected in the computer.

Block 1306 represents using one or more camera pixels 420 to measure the destructive interference (a destructive interference signal) between the reference radiation 404 and backscattered radiation 416 on the one or more pixels 420.

Block 1308 represents receiving, in the one or more computers, the destructive interference signal.

Block 1310 represents repeating steps 1302-1308 using the destructive interference signal as feedback in the next instance of Block 1302, wherein a new phase, amplitude, and/or increment that increases the destructive interference is calculated and modulated into the reference field. In one or more embodiments, the digitally adjusting comprises sweeping a power and phase of the reference electromagnetic radiation until glare on the one or more sensor pixels 420 caused by the backscattered radiation is suppressed below a desired level (e.g., the fields/wavefronts of the backscattered radiation 416 and the reference radiation 404 cancel or at least partially cancel each other out on the pixels 420). The sensor pixels 420 image (or form an image of) the object 412 when the glare is suppressed to the desired level.

c. Pixel Reference Sweep (PRS) Process

FIG. 14 illustrates a method of digitally adjusting a phase and/or amplitude of a reference field of the reference radiation 404 in a pixel sweep process. The sensor pixel is a single photodetector with a photosensitive area that is equal to or smaller than a speckle size of the imaging radiation at the image plane. In one or more embodiments, the electromagnetic radiation is laser radiation or light.

Block 1400 represents raster-scanning the single photodetector laterally through one or more positions in the image plane 428.

Block 1402 represents, at each of the positions, phase stepping a phase of the reference radiation 404 through 3 increments.

Block 1404 represents, for each of the 3 increments, measuring a signal on the photodetector resulting from the interference between the reference radiation 404 and the backscattered radiation 416 on the photodetector.

Block 1406 represents using the signals to calculate a cancellation phase that suppresses the backscattered radiation 416 on the photodetector below a desired level or to a minimum level, as described in FIG. 10 and associated text of the PRS embodiment.

Block 1408 represents adjusting/modifying the reference radiation 404 such the reference radiation has the cancelation phase at the photodetector.

Block 1410 represents varying an amplitude of the reference radiation 404 having the cancelation phase while measuring the signal. In one or more embodiments, the amplitude can comprise the amplitude of the field measured in Block 1406.

Block 1412 represents selecting the amplitude wherein the signal is minimized or reduced below a desired level, indicating that the backscattered radiation 404 is suppressed and the fields/wavefronts of the backscattered radiation 416 and the reference radiation 404 cancel each other out (or at least partially cancel each other out) at the photodetector. The method is repeated for a plurality of the positions in the image plane 428 to generate an image of the object 412 using the imaging radiation while the glare 416 is suppressed at the photodetector using the reference radiation 404.

Imaging Apparatus Fabrication Method

Figure 15:
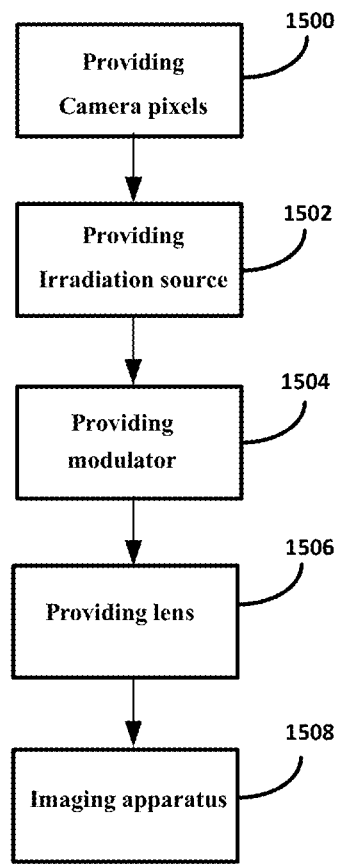
FIG. 15 is a flowchart illustrating a method of fabricating an imaging apparatus according to one or more embodiments of the present invention.

FIG. 15 illustrates a method of fabricating an imaging apparatus according to one or more embodiments of the present invention. The method comprises the following steps (referring also to FIG. 3 and FIG. 4).

Block 1500 represents positioning one or more sensor pixels 420, 302a receiving backscattered radiation 318 and imaging radiation 414 when electromagnetic radiation 402, 304 irradiates a scattering medium 408, 316 and an object 412, 320 behind the scattering medium.

Block 1502 represents providing a source of electromagnetic radiation.

In one or more embodiments, the source of the electromagnetic radiation comprises one or more laser beam sources, each of the laser beam sources 302b optically located at the same imaging plane 310 position as a different one of the sensor pixels 302a, as discussed above in Block 600.

In one or more embodiments, the source comprises a laser emitting a laser beam and a beamsplitter splitting the reference radiation 404 and the object radiation 402 from the laser beam of radiation prior to irradiating the scattering medium with the object radiation 402.

Block 1504 represents electromagnetically coupling one or more modulators AM, PM, SLM, DMD to the one or more sensor pixels 420, 302a, such that the modulator(s) are capable of digitally adjusting a phase and/or amplitude of reference radiation and transmitting the reference radiation onto the one or more sensor pixels so that the reference radiation destructively interferes with the backscattered radiation on the one or more camera pixels 420, 302a while the camera pixels 420, 302a image the object 412.

In one or more embodiments, the step comprises providing a DOPC device. The DOPC device includes a camera CCD measuring a backscattered field/wavefront 312 of a portion of the backscattered radiation 318 when the electromagnetic radiation comprises the laser beams emitted from the laser beam sources 302b.

One or more processors included or connected to the DOPC receive the backscattered field from the camera (CCD), compute the phase conjugate of the backscattered field/wavefront 312 (forming a phase conjugate field), and phase shift the phase conjugate field (forming a phase shifted field/wavefront 314).

The DOPC device further includes a SLM or a DMD having an input receiving the phase shifted field and forming the reference radiation having the phase shifted field, the SLM or the DMD transmitting the reference radiation (having the phase shifted field) towards the scattering medium 316.

The SLM/DMD and the camera are typically coupled/aligned such that one SLM pixel is imaged onto one camera pixel. In one or more embodiments, the SLM (e.g., a vis-PLUTO, Holoeye, Germany) is carefully aligned (1:1 pixel-to-pixel match) to the image plane of a high dynamic range sCMOS camera (e.g., pco.edge, PCO AG, Germany).

Block 1506 represents providing a camera lens 332, 424 capable of imaging the object 320, 412 on the one or more sensor pixels 302a, 420 using the imaging radiation 414 while focusing the backscattered radiation 318, 416 and reference radiation 404 on the one or more sensor pixels 302a, 420. Thus, in one or more embodiments, imaging camera comprises camera lens 332, camera pixels 302a, and optionally also an array of light sources 302b. The reference radiation 404 destructively interferes with the backscattered radiation 318, 416 on the one or more sensor pixels 302a, 420 while the camera lens 332, 424 images (or forms an image of) the object 320, 412 on the sensor pixels.

Block 1508 represents the end result, an imaging apparatus or system (e.g., as illustrated in FIG. 3 and FIG. 4). In one or more embodiments, the imaging apparatus is used together with a vehicle headlight (e.g., boat headlight, car headlight, aircraft headlight) wherein the headlight provides the illumination source 400, 304 for the imaging apparatus.

Hardware Environment

Figure 16:
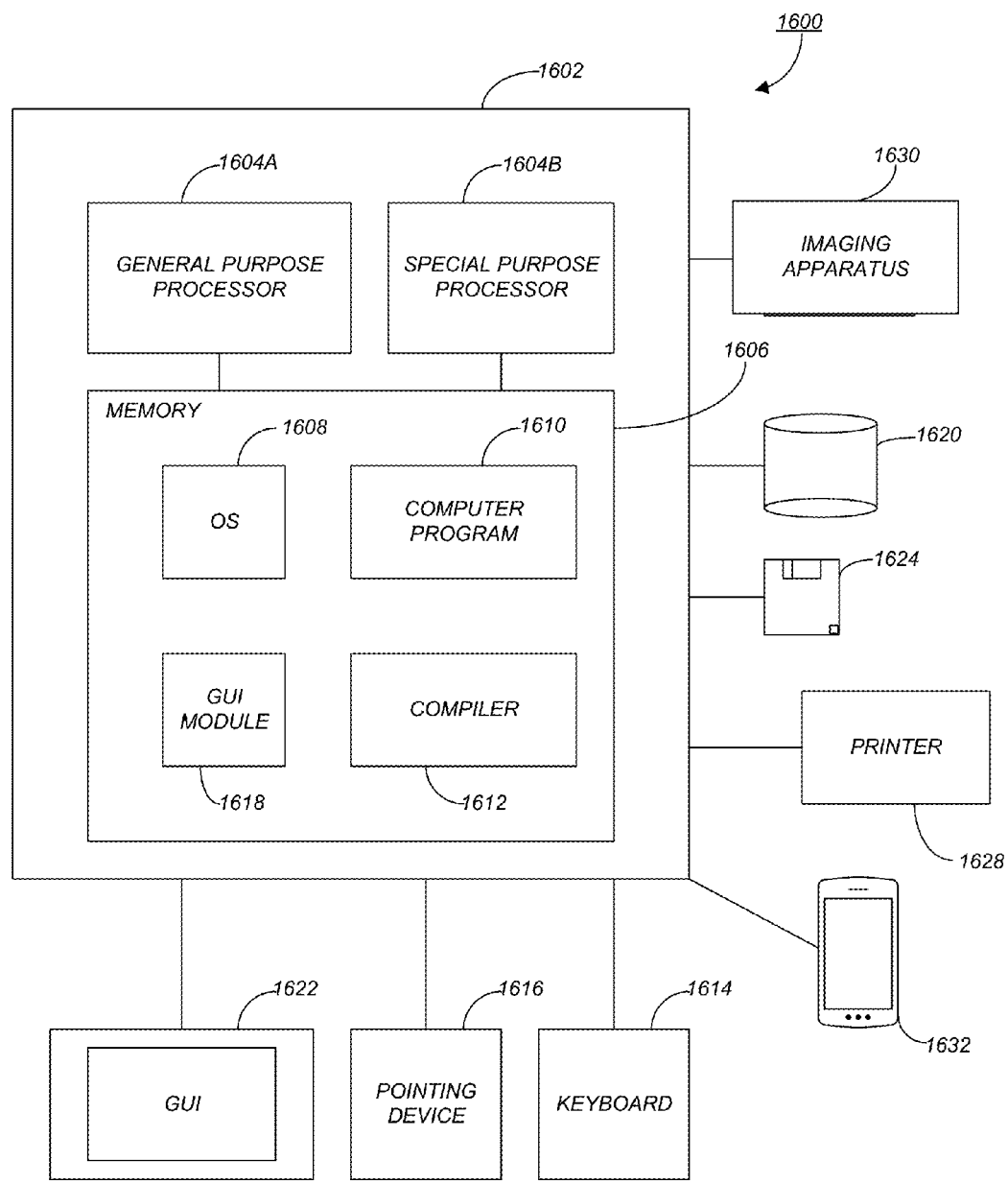
FIG. 16 is an exemplary hardware and software environment used to implement one or more embodiments of the invention.

FIG. 16 is an exemplary hardware and software environment 1600 used to implement one or more embodiments of the invention. The hardware and software environment includes a computer 1602 and may include peripherals. Computer 1602 may be a user/client computer, server computer, or may be a database computer. The computer 1602 comprises a general purpose hardware processor 1604A and/or a special purpose hardware processor 1604B (hereinafter alternatively collectively referred to as processor 1604) and a memory 1606, such as random access memory (RAM). The computer 1602 may be coupled to, and/or integrated with, other devices, including input/output (I/O) devices such as a keyboard 1614, a cursor control device 1616 (e.g., a mouse, a pointing device, pen and tablet, touch screen, multi-touch device, etc.) and a printer 1628. In one or more embodiments, computer 1602 may be coupled to, or may comprise, a device 1632 such as a desktop computer (e.g., HP Compaq™), portable device 1632, integrated circuit, chip, Field programmable Gate Array (FPGA), raspberry Pi, cellular device, personal digital assistant, mobile phone, multi-touch device, gaming system, internet enabled television, television set top box, or other internet enabled device executing on various platforms and operating systems).

In one embodiment, the computer 1602 operates by the general purpose processor 1604A performing instructions defined by the computer program 1610 under control of an operating system 1608. The computer program 1610 and/or the operating system 1608 may be stored in the memory 1606 and may interface with the user and/or other devices to accept input and commands and, based on such input and commands and the instructions defined by the computer program 1610 and operating system 1608, to provide output and results.

Output/results may be presented on the display 1622 or provided to another device for presentation or further processing or action. In one embodiment, the display 1622 comprises a liquid crystal display (LCD) having a plurality of separately addressable liquid crystals. Alternatively, the display 1622 may comprise a light emitting diode (LED) display having clusters of red, green and blue diodes driven together to form full-color pixels. Each liquid crystal or pixel of the display 1622 changes to an opaque or translucent state to form a part of the image on the display in response to the data or information generated by the processor 1604 from the application of the instructions of the computer program 1610 and/or operating system 1608 to the input and commands. The image may be provided through a graphical user interface (GUI) module 1618. Although the GUI module 1618 is depicted as a separate module, the instructions performing the GUI functions can be resident or distributed in the operating system 1608, the computer program 1610, or implemented with special purpose memory and processors.

In one or more embodiments, the display 1622 is integrated with/into the computer 1602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 1602 according to the computer program 1610 instructions may be implemented in a special purpose processor 1604B. In this embodiment, some or all of the computer program 1610 instructions may be implemented via firmware instructions stored in a read only memory (ROM), a programmable read only memory (PROM) or flash memory within the special purpose processor 1604B or in memory 1606. The special purpose processor 1604B may also be hardwired through circuit design to perform some or all of the operations to implement the present invention. Further, the special purpose processor 1604B may be a hybrid processor, which includes dedicated circuitry for performing a subset of functions, and other circuits for performing more general functions such as responding to computer program 1610 instructions. In one embodiment, the special purpose processor 1604B is an application specific integrated circuit (ASIC).

The computer 1602 may also implement a compiler 1612 that allows an application or computer program 1610 written in a programming or control language such as C, C++, Assembly, SQL, PYTHON, PROLOG, MATLAB, RUBY, RAILS, HASKELL, or other language to be translated into processor 1604 readable code. Alternatively, the compiler 1612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1610 accesses and manipulates data accepted from I/O devices and stored in the memory 1606 of the computer 1602 using the relationships and logic that were generated using the compiler 1612.

The computer 1602 also optionally comprises an external communication device such as a modem, satellite link, Ethernet card, or other device for accepting input from, and providing output to, other computers 1602.

In one embodiment, instructions implementing the operating system 1608, the computer program 1610, and the compiler 1612 are tangibly embodied in a non-transitory computer-readable medium, e.g., data storage device 1620, which could include one or more fixed or removable data storage devices, such as a zip drive, floppy disc drive 1624, hard drive, CD-ROM drive, tape drive, etc. Further, the operating system 1608 and the computer program 1610 are comprised of computer program 1610 instructions which, when accessed, read and executed by the computer 1602, cause the computer 1602 to perform the steps necessary to implement and/or use the present invention or to load the program of instructions into a memory 1606, thus creating a special purpose data structure causing the computer 1602 to operate as a specially programmed computer or controller executing the method steps described herein (e.g., digitally adjusting the phase and/or amplitude of the reference field and/or controlling the various components of the imaging apparatus 1630 as illustrated in FIGS. 3-15 and associated text). Computer program 1610 and/or operating instructions may also be tangibly embodied in memory 1606 and/or the imaging apparatus 1630 (e.g., as illustrated in FIGS. 3-15 and the associated text), thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1602.

Figure 17:
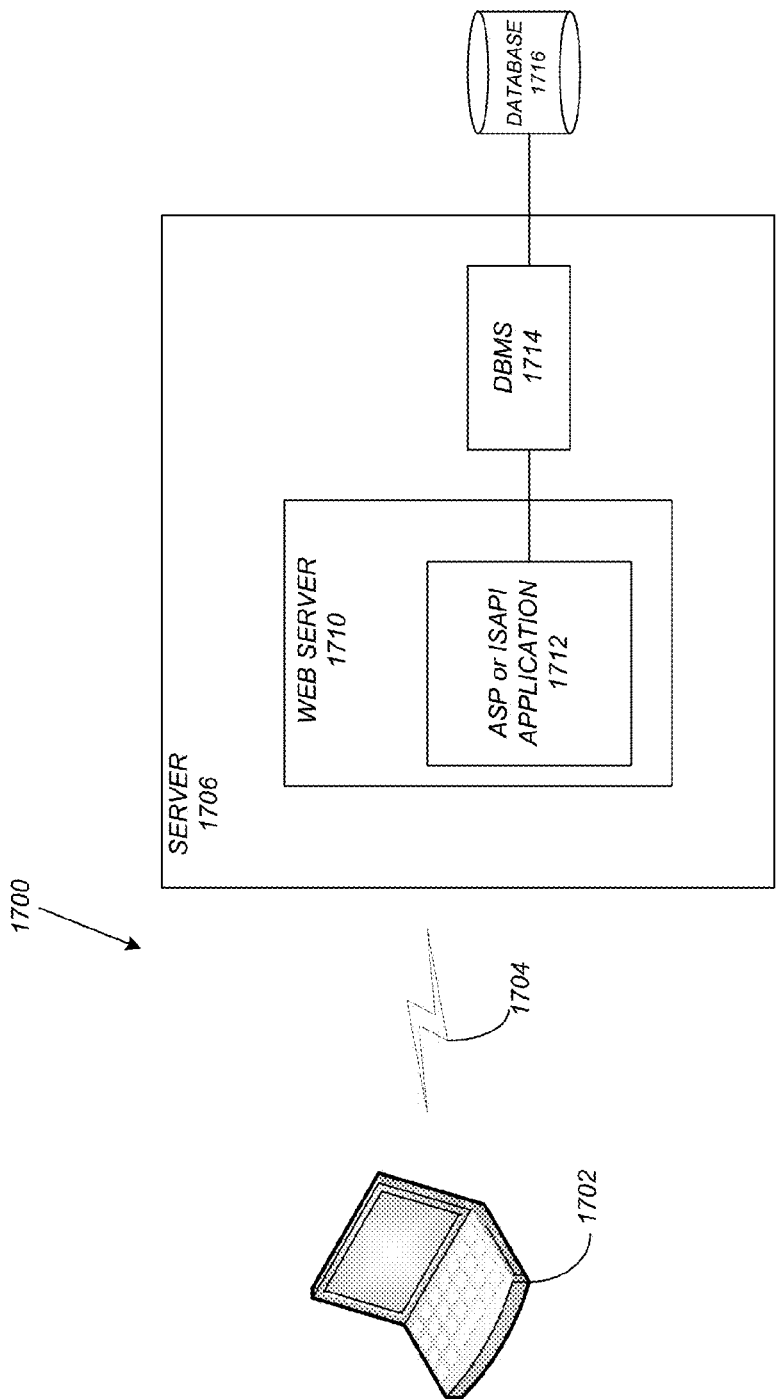
FIG. 17 schematically illustrates a typical distributed/cloud-based computer system using a network to connect client computers to server computers, according to one or more embodiments of the invention.

FIG. 17 schematically illustrates a typical distributed/cloud-based computer system 1700 using a network 1704 to connect client computers 1702 to server computers 1706. A typical combination of resources may include a network 1704 comprising the Internet, LANs (local area networks), WANs (wide area networks), SNA (systems network architecture) networks, or the like, clients 1702 that are personal computers or workstations, and servers 1706 that are personal computers, workstations, minicomputers, or mainframes. However, it may be noted that different networks such as a cellular network (e.g., GSM [global system for mobile communications] or otherwise), a satellite based network, or any other type of network may be used to connect clients 1702 and servers 1706 in accordance with embodiments of the invention.

A network 1704 such as the Internet connects clients 1702 to server computers 1706. Network 1704 may utilize ethernet, coaxial cable, wireless communications, radio frequency (RF), etc. to connect and provide the communication between clients 1702 and servers 1706. Further, in a cloud-based computing system, resources (e.g., storage, processors, applications, memory, infrastructure, etc.) in clients 1702 and server computers 1706 may be shared by clients 1702, server computers 1706, and users across one or more networks. Resources may be shared by multiple users and can be dynamically reallocated per demand. In this regard, cloud computing may be referred to as a model for enabling access to a shared pool of configurable computing resources.

Clients 1702 may execute a client application or web browser and communicate with server computers 1706 executing web servers 1710. Such a web browser is typically a program such as MICROSOFT INTERNET EXPLORER, MOZILLA FIREFOX, OPERA, APPLE SAFARI, GOOGLE CHROME, etc. Further, the software executing on clients 1702 may be downloaded from server computer 1706 to client computers 1702 and installed as a plug-in or ACTIVEX control of a web browser. Accordingly, clients 1702 may utilize ACTIVEX components/component object model (COM) or distributed COM (DCOM) components to provide a user interface on a display of client 1702. The web server 1710 is typically a program such as MICROSOFT'S INTERNET INFORMATION SERVER.

Web server 1710 may host an Active Server Page (ASP) or Internet Server Application Programming Interface (ISAPI) application 1712, which may be executing scripts. The scripts invoke objects that execute business logic (referred to as business objects). The business objects then manipulate data in database 1716 through a database management system (DBMS) 1714. Alternatively, database 1716 may be part of, or connected directly to, client 1702 instead of communicating/obtaining the information from database 1716 across network 1704. When a developer encapsulates the business functionality into objects, the system may be referred to as a component object model (COM) system. Accordingly, the scripts executing on web server 1710 (and/or application 1712) invoke COM objects that implement the business logic. Further, server 1706 may utilize MICROSOFT'S TRANSACTION SERVER (MTS) to access required data stored in database 1716 via an interface such as ADO (Active Data Objects), OLE DB (Object Linking and Embedding DataBase), or ODBC (Open DataBase Connectivity).

Generally, these components 1700-1716 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1702 and 1706 may be interchangeable and may further include thin client devices with limited or full processing capabilities, portable devices such as cell phones, notebook computers, pocket computers, multi-touch devices, and/or any other devices with suitable processing, communication, and input/output capability.

Embodiments of the invention are implemented as a software application on a client 1702 or server computer 1706. Further, as described above, the client 1702 or server computer 1706 may comprise a thin client device or a portable device that has a multi-touch-based display.

Of course, those skilled in the art will recognize that any combination of the above components, or any number of different components, peripherals, and other devices, may be used with computers 1702 and 1706.

Further information on one or more embodiments of the present invention can be found in [41-42].

REFERENCES

The following references are incorporated by reference herein.

[1] A. P. Mosk, A. Lagendijk, G. Lerosey, and M. Fink, "Controlling waves in space and time for imaging and focusing in complex media," Nat. Photonics 6, 283-292 (2012).
[2] R. Horstmeyer, H. Ruan, and C. Yang, "Guidestar-assisted wavefront shaping methods for focusing light into biological tissue," Nat. Photonics 9, 563-571 (2015).
[3] Z. Yaqoob, D. Psaltis, M. S. Feld, and C. Yang, "Optical phase conjugation for turbidity suppression in biological samples," Nat. Photonics 2, 110-115 (2008).
[4] J. Bertolotti, E. G. van Putten, C. Blum, A. Lagendijk, W. L. Vos, and A. P. Mosk, "Non-invasive imaging through opaque scattering layers," Nature 491, 232-234 (2012).
[5] O. Katz, E. Small, and Y. Silberberg, "Looking around corners and through thin turbid layers in real time with scattered incoherent light," Nat. Photonics 6, 549-553 (2012).
[6] N. Ji, D. E. Milkie, and E. Betzig, "Adaptive optics via pupil segmentation for high-resolution imaging in biological tissues," Nat. Methods 7, 141-147 (2009).
[7] Y M. Wang, B. Judkewitz, C. A. DiMarzio, and C. Yang, "Deep-tissue focal fluorescence imaging with digitally time-reversed ultrasoundencoded light," Nat. Commun. 3, 928 (2012).
[8] E. H. Zhou, H. Ruan, C. Yang, and B. Judkewitz, "Focusing on moving targets through scattering samples," Optica 1, 227-232 (2014).
[9] X. Yang, Y. Pu, and D. Psaltis, "Imaging blood cells through scattering biological tissue using speckle scanning microscopy," Opt. Express 22, 3405-3413 (2014).
[10] C. L. Hsieh, Y. Pu, R. Grange, and D. Psaltis, "Digital phase conjugation of second harmonic radiation emitted by nanoparticles in turbid media," Opt. Express 18, 12283-12290 (2010).
[11] O. Katz, P. Heidmann, M. Fink, and S. Gigan, "Non-invasive single-shot imaging through scattering layers and around corners via speckle correlations," Nat. Photonics 8, 784-790 (2014).
[12] E. Edrei and G. Scarcelli, "Optical imaging through dynamic turbid media using the Fourier-domain shower-curtain effect," Optica 3, 71-74 (2016).
[13] M. Laurenzis, F. Christnacher, D. Monnin, and I. Zielenski, "3D range gated imaging in scattering environments," Proc. SPIE 7684, 768406 (2010).
[14] M. Laurenzis, F. Christnacher, D. Monnin, and T. Scholz, "Investigation of range-gated imaging in scattering environments," Opt. Eng. 51, 061303 (2012).
[15] M. Laurenzis and E. Bacher, "Image coding for three-dimensional range gated imaging," Appl. Opt. 50, 3824-3828 (2011).
[16] M. Buttafava, J. Zeman, A. Tosi, K. Eliceiri, and A. Velten, "Non-lineof-sight imaging using a time-gated single photon avalanche diode," Opt. Express 23, 20997-21011 (2015).
[17] G. Gariepy, N. Krstajic, R. Henderson, C. Li, R. R. Thomson, G. S. Buller, B. Heshmat, R. Raskar, J. Leach, and D. Faccio, "Single-photon sensitive light-in-fight imaging," Nat. Commun. 6, 6021 (2015).
[18] F. Guerrieri, S. Tisa, A. Tosi, and F. Zappa, "Two-dimensional SPAD imaging camera for photon counting," IEEE Photon. J. 2, 759-774 (2010).
[19] G. Gariepy, F. Tonolini, R. Henderson, J. Leach, and D. Faccio, "Detection and tracking of moving objects hidden from view," Nat. Photonics 2, 1049-1052 (2015).
[20] A. Velten, T. Willwacher, O. Gupta, A. Veeraraghavan, M. G. Bawendi, and R. Raskar, "Recovering three-dimensional shape around a corner using ultrafast time-of-flight imaging," Nat. Commun. 3, 745 (2012).
[21] A. Kadambi, V. Taamazyan, S. Jayasuriya, and R. Raskar, "Frequency domain TOF: encoding object depth in modulation frequency," arXiv:1503.01804 (2015).
[22] L. Gao, J. Liang, C. Li, and L. V. Wang, "Single-shot compressed ultrafast photography at one hundred billion frames per second," Nature 516, 74-77 (2014).
[23] J. Liang, L. Gao, P. Hai, C. Li, and L. V. Wang, "Encrypted three dimensional dynamic imaging using snapshot time-of-flight compressed ultrafast photography," Sci. Rep. 5, 15504 (2015).
[24] L. Zhu, Y. Chen, J. Liang, Q. Xu, L. Gao, C. Ma, and L. V. Wang, "Space and intensity-constrained reconstruction for compressed ultrafast photography," Optica 3, 694 (2016).
[25] R. R. Leitch and M. O. Tokhi, "Active noise control systems," IEE Proc. Part A 134, 525-546 (1987).
[26] D. Huang, E. A. Swanson, C. P. Lin, J. S. Schuman, W. G. Stinson, W. Chang, M. R. Hee, T. Flotte, K. Gregory, C. A. Puliafito, and J. G. Fujimoto, "Optical coherence tomography," Science 254, 1178-1181 (1991).
[27] I. Grulkowski, J. Liu, and B. Potsaid, "High-precision, high-accuracy ultralong-range swept-source optical coherence tomography using vertical cavity surface emitting laser light source," Opt. Lett. 38, 673-675 (2013).
[28] S. Woo, S. Kang, C. Yoon, H. Ko, and W. Choi, "Depth-selective imaging of macroscopic objects hidden behind a scattering layer using low coherence and widefield interferometry," Opt. Commun. 372, 210-214 (2016).
[29] I. Yamaguchi, T. Matsumura, and J.-I. Kato, "Phase-shifting color digital holography," Opt. Lett. 27, 1108-1110 (2002).

[30] S. Zhang, D. Van Der Weide, and J. Oliver, "Superfast phase-shifting method for 3-D shape measurement," Opt. Express 18, 9684-9689 (2010).

[31] P. S. Huang and S. Zhang, "Fast three-step phase-shifting algorithm," Appl. Opt. 45, 5086-5091 (2006)

[32] Goodman, Joseph W. Speckle phenomena in optics: theory and applications. Roberts and Company Publishers, 2007.

[33] Cui, Men, and Changhuei Yang. "Implementation of a digital optical phase conjugation system and its application to study the robustness of turbidity suppression by phase conjugation." Optics Express 18.4 (2010): 3444-3455.

[34] Popoff, S. M., et al. "Measuring the transmission matrix in optics: an approach to the study and control of light propagation in disordered media." Physical review letters 104.10 (2010): 100601.

[35] Katz, Ori, et al. "Non-invasive single-shot imaging through scattering layers and around corners via speckle correlations." Nature Photonics 8.10 (2014): 784-790.

[36] Huang, David, et al. "Optical coherence tomography." Science 254.5035 (1991): 1178-1181.

[37] Larimer, J., et al. Engineering a visual system for seeing through fog. No. 921130. SAE Technical Paper, 1992.

[38] Lohman, A. W., and H. Stimulus. "Holography through fog. A new version." Optics Communications 26.3 (1978): 318-321.

[39] Stimulus, H. "Real-time seeing through moving fog." Optics Communications 17.3 (1976): 245-246.

[40] Yamaguchi, I., Matsumura, T. & Kato, J.-I. Phase-shifting color digital holography. Opt. Lett. 27, 1108-10 (2002).

[41] Glare suppression by coherence gated negation, by Edward Haojiang Zhou, Atsushi Shibukawa, Joshua Brake, Haowen Ruan, and Changhuei Yang, Vol. 3, No. 10/October 2016/Optica 1107, as downloaded on Oct. 24, 2016 from the website entitled "https://www.osapublishing.org/optica/abstract. cfm?URI=optica-3-10-1107."

[42] Glare suppression by coherence gated negation: supplementary material for [41] as downloaded on Oct. 24, 2016 from the website entitled "https://www.osapublishing.org/optica/abstract.cfm?URI=optica-3-10-1107." See also visualization at the same website address.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of imaging an object with reduced glare, comprising:
    irradiating a scattering medium and an object behind the scattering medium with electromagnetic radiation, wherein:
        the scattering medium backscatters a first portion of the electromagnetic radiation forming backscattered radiation, and
        the object reflects a second portion of the electromagnetic radiation forming imaging radiation;
    receiving the backscattered radiation and the imaging radiation on one or more sensor pixels; and
    digitally adjusting a phase, an amplitude, or a phase and amplitude, of reference radiation transmitted onto the one or more sensor pixels, wherein the reference radiation destructively interferes with the backscattered radiation on the one or more sensor pixels while the object is imaged on the one or more sensor pixels using the imaging radiation.

2. The method of claim 1, wherein the scattering medium comprises water vapor.

3. The method of claim 1, further comprising:
    measuring a backscattered field of a portion of the backscattered radiation, wherein the digitally adjusting comprises:
        computing a phase conjugate field comprising a phase conjugate of the backscattered field;
        computing a phase shifted field by phase shifting the phase conjugate field; and
        generating phase shifted radiation having the phase shifted field; and
    irradiating the scattering medium with the phase shifted radiation, wherein the phase shifted radiation scatters off the scattering medium forming the reference radiation destructively interfering with the backscattered radiation on the one or more sensor pixels.

4. The method of claim 3, further comprising:
    emitting the electromagnetic radiation from one or more laser beam sources, each of the laser beam sources optically located at the same imaging plane position as a different one of the sensor pixels.

5. The method of claim 4, further comprising:
    detecting the backscattered field in a digital optical phase conjugation (DOPC) device; and
    generating the phase shifted radiation in the DOPC device, wherein the DOPC includes:
    a camera detecting the backscattered field; and
    a spatial light modulator or a deformable mirror device electromagnetically coupled to the camera, wherein the spatial light modulator or the deformable mirror device generate the phase shifted radiation.

6. The method of claim 1, further comprising:
    splitting the reference radiation from the electromagnetic radiation prior to irradiating the scattering medium with the electromagnetic radiation, wherein:
    the reference radiation does not interact with the scattering medium or the object; and
    the digitally adjusting comprises sweeping a power and phase of the reference radiation until glare on the one or more sensor pixels caused by the backscattered radiation is suppressed such that the object is visible in an image formed on the sensor pixels by the imaging radiation.

7. The method of claim 1, wherein:
    the one or more sensor pixels comprise a single photodetector at a camera lens' image plane, the photodetector having a photosensitive area that is equal to or smaller than a speckle size of the imaging radiation at the image plane;
    the digitally adjusting comprises:
        raster-scanning the photodetector laterally through one or more positions in the image plane;
        at each of the positions, phase stepping a phase of the reference radiation through 3 increments;
        for each of the 3 increments, measuring the signal on the photodetector resulting from the interference between the reference radiation and the backscattered radiation on the photodetector;
using the signals to calculate a cancellation phase that suppresses a magnitude of the backscattered radiation on the photodetector;
adjusting the reference radiation such the reference radiation has the cancellation phase; and
selecting the amplitude wherein the signal is minimized or reduced such that the object is visible in an image formed using the photodetector and the imaging radiation.

8. The method of claim 1, wherein:
the sensor pixels' size is smaller than $1.22\lambda/2NA$, where $\lambda$ is the wavelength of the electromagnetic radiation and NA is a numerical aperture of a camera lens imaging the backscattered radiation onto the one or more sensor pixels, and
the electromagnetic radiation is emitted from one or more lasers.

9. The method of claim 1, wherein the electromagnetic radiation has a coherence length longer than an optical path length of the electromagnetic radiation through the scattering medium.

10. An imaging apparatus, comprising:
one or more sensor pixels receiving backscattered radiation and imaging radiation when electromagnetic radiation irradiates a scattering medium and an object behind the scattering medium, wherein:
the scattering medium backscatters a first portion of the electromagnetic radiation forming the backscattered radiation; and
the object reflects a second portion of the electromagnetic radiation forming the imaging radiation;
one or more modulators electromagnetically coupled to the one or more sensor pixels, one of the modulators digitally adjusting a phase of reference electromagnetic radiation and transmitting the reference electromagnetic radiation onto the one or more sensor pixels; and
a camera lens focusing the reference electromagnetic radiation, the backscattered radiation, and the imaging radiation onto the one or more sensor pixels, wherein the reference electromagnetic radiation destructively interferes with the backscattered radiation while the camera lens images the object on the one or more sensor pixels using the imaging radiation.

11. The imaging apparatus of claim 10, further comprising:
one or more laser beam sources, each of the laser beam sources optically located at the same imaging plane position as a different one of the sensor pixels;
a digital optical phase conjugation (DOPC) device including:
a camera measuring a backscattered field of a portion of the backscattered radiation when the laser beam sources emit the electromagnetic radiation,
one or more processors:
receiving the backscattered field from the camera;
computing a phase conjugate field comprising a phase conjugate of the backscattered field,
computing a phase conjugate field by phase shifting the phase conjugate field, and
a spatial light modulator (SLM) or a deformable mirror device (DMD) transmitting the reference electromagnetic radiation having the phase shifted field towards the scattering medium, wherein the reference electromagnetic radiation scatters off the scattering medium prior to destructively interfering with the backscattered radiation on the sensor pixels.

12. The apparatus of claim 10, wherein:
the camera lens images the object on the sensor pixel comprising a single photodetector at the camera lens' image plane;
the single photodetector has a photosensitive area that is equal to or smaller than a speckle size of the imaging radiation at the image plane; and
the apparatus further comprises one or more processors controlling the adjusting of the phase and the amplitude of the reference electromagnetic radiation, such that:
a translation stage raster-scans the photodetector laterally through one or more positions in the image plane;
at each of the positions, one of the modulators phase steps the phase of the reference electromagnetic radiation through 3 increments;
for each of the 3 increments, the photodetector measures a signal resulting from the interference between the reference electromagnetic radiation and the backscattered radiation on the photodetector;
the one or more processors use the signals to calculate a cancellation phase that suppresses the backscattered radiation below a desired level on the photodetector;
the one of the modulators adjusts the reference electromagnetic radiation such the reference electromagnetic radiation has the cancelation phase; and
the one or more processors select the amplitude wherein the signal is reduced below a desired level such that the object is visible in an image formed using the photodetector and the imaging radiation.

13. The apparatus of claim 10, further comprising one or more laser sources emitting the electromagnetic radiation, wherein:
the sensor pixels' size is smaller than $1.22\lambda/2NA$ where $\lambda$ is the wavelength of the radiation and NA is a numerical aperture of a camera lens imaging the backscattered radiation onto the one or more sensor pixels.

14. The apparatus of claim 10, further comprising a laser emitting the electromagnetic radiation, the laser having a coherence length longer than an optical path length of the electromagnetic radiation through the scattering medium.

15. The apparatus of claim 10, wherein the scattering medium comprises water vapor.

16. A method of imaging an object, comprising:
in a computer, digitally adjusting a phase, amplitude, or the phase and the amplitude of reference electromagnetic radiation;
outputting, from the computer, the phase, the amplitude, or the phase and the amplitude, to a modulator, the modulator transmitting the reference electromagnetic radiation to one or more sensor pixels, the reference electromagnetic radiation destructively interfering with backscattered radiation on the one or more sensor pixels while the sensor pixels image an object using imaging radiation, the backscattered radiation and the imaging radiation formed using a process comprising:
irradiating a scattering medium and an object behind the scattering medium with electromagnetic radiation, wherein:
the scattering medium backscatters a first portion of the electromagnetic radiation forming the backscattered radiation, and
the object reflects a second portion of the electromagnetic radiation forming the imaging radiation.

17. The method of claim 16, further comprising:
receiving three signals measured from the interference between the reference electromagnetic radiation and the backscattered radiation for three different phase values of the reference electromagnetic radiation;
using the three signals to calculate a cancellation phase for the reference electromagnetic radiation;
outputting the cancellation phase to the modulator, wherein the reference electromagnetic radiation comprising the cancellation phase destructively interferes with backscattered radiation on the one or more sensor pixels while the sensor pixels image the object using imaging radiation.

18. The method of claim 16, wherein the digitally adjusting comprises phase conjugating and phase shifting the phase, the amplitude, or the phase and the amplitude of reference electromagnetic radiation.

19. The method of claim 16, wherein the digitally adjusting comprises sweeping a power and the phase of the reference radiation until glare on the one or more sensor pixels caused by the backscattered radiation is suppressed such that the object is visible in an image formed on the sensor pixels by the imaging radiation.

20. The method of claim 16, wherein the imaging radiation and the reference electromagnetic radiation comprises laser radiation and the scattering medium comprises fog.

* * * * *